United States Patent [19]

Bluish et al.

[11] Patent Number: 4,621,335
[45] Date of Patent: Nov. 4, 1986

[54] REAL TIME RECALL FEATURE FOR AN ENGINE DATA PROCESSOR SYSTEM

[75] Inventors: Joseph A. Bluish; Mark B. Hanson, both of South Bend, Ind.

[73] Assignee: Allied Corporation, Morristown, N.J.

[21] Appl. No.: 486,976

[22] Filed: May 31, 1983

[51] Int. Cl.[4] .................. G11B 5/02; G08E 23/00; G06F 15/36
[52] U.S. Cl. ...................... 364/550; 340/945; 360/5; 369/21; 364/900
[58] Field of Search .......... 364/200, 900, 424, 431.01, 364/431.02, 550, 551

[56] References Cited

U.S. PATENT DOCUMENTS

| | | | |
|---|---|---|---|
| 4,215,412 | 7/1980 | Bernier et al. | 364/551 |
| 4,270,174 | 5/1981 | Karlin et al. | 364/551 |
| 4,280,185 | 7/1981 | Martin | 364/431.01 |
| 4,399,513 | 8/1983 | Sullivan et al. | 364/551 |
| 4,409,670 | 10/1983 | Herndon et al. | 364/900 |
| 4,470,116 | 9/1984 | Ratchford | 364/424 |

OTHER PUBLICATIONS

Athani, Microprocessor Based Data Acquisition System, Microprocessors & Microsystems (G.B.), vol. 3, No. 8, Oct. 1979, pp. 359-364.
Conroy, Computer Controlled Data Acquisition and Processing System, Conference Proceedings of the 16th International Aerospace Instrumentation Symposium, Seattle, WA, May 1976, pp. 212-219.
Olsson et al., Beyond Simple Measurements, On Board Monitor for Vehicle Prognosis, Conference: Instrumentation in the Aerospace Industry, vol. 26, Proceedings 26th Int. Symposium, Seattle, WA, pp. 271-280, 5-8 May, 1980.
Barton et al., L-1011 Flight Test PCM/FM Ground Data Processor, Conference Proceedings of the 16th International Aerospace Instrumentation Symposium, Seattle, WA, May 1970, pp. 234-241.
Titus, Data-Acquisition System Built Modularly Around Intel 8080, Textbook: Applying Microprocessors, Altman et al., Electronics Magazine Book Series, pp. 188-190.

Primary Examiner—Felix D. Gruber
Attorney, Agent, or Firm—Ronald D. Welch; Ken C. Decker

[57] ABSTRACT

A real-time recall feature for an engine data processor (20). An engine mounted data processor (20) inputs a plurality of engine operating parameters from a gas turbine engine (10). These parameters are fault checked and reformatted by the processor (20) before being output on a serial transmission channel (XCH) to an airframe mounted permanent recording apparatus (30). A set of the most recent engine profiles are stored in a dynamic random access memory (DRAM) which is constantly updated by overlaying the oldest data with the most recent. A switch (52) generates a signal (FRZ) to terminate storage of the profiles and freeze the contents of the (DRAM). The memory remains frozen having captured the most recent engine profiles associated with the generation time of the signal (FRZ) until unloaded over the channel (XCH) to recorder (30). The output of the (DRAM) is in response to a signal (RPL) generated by switch (52).

5 Claims, 25 Drawing Figures

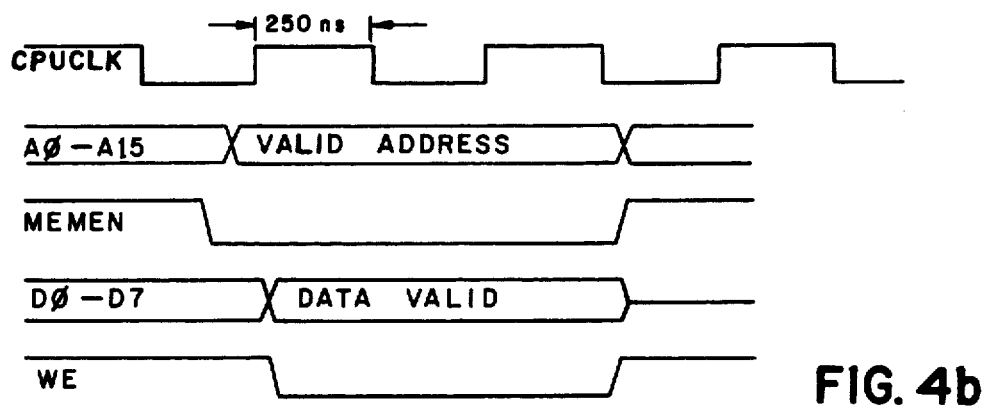
FIG. 4b
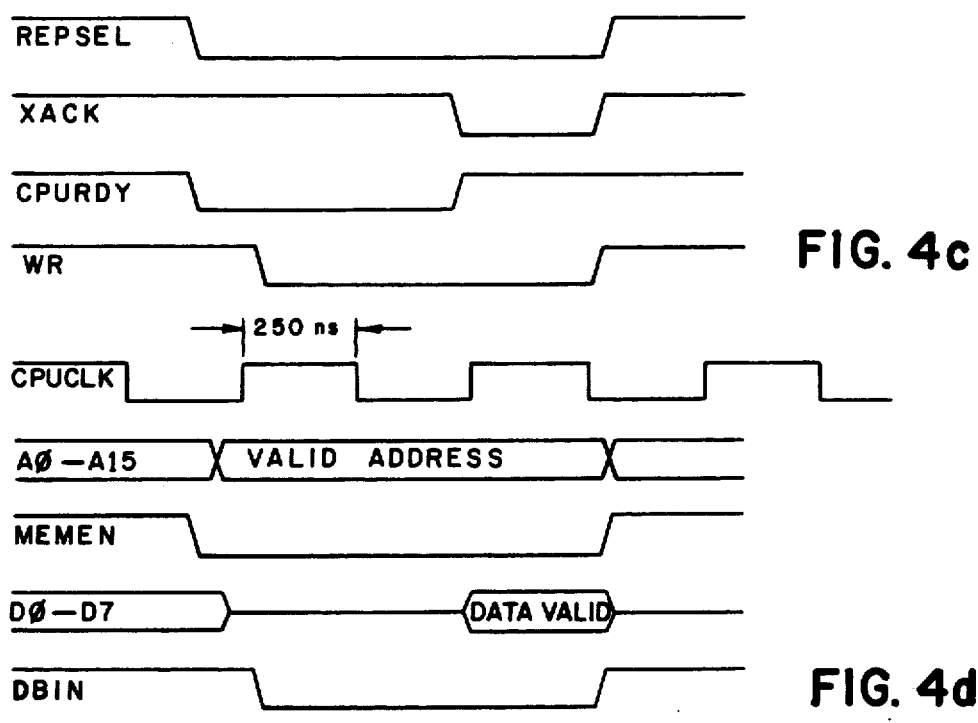
FIG. 4c
FIG. 4d
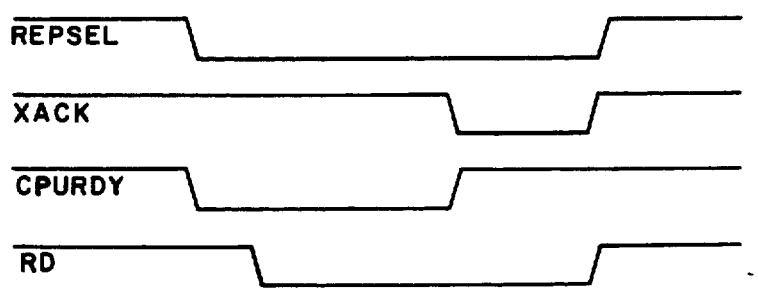
FIG. 4e

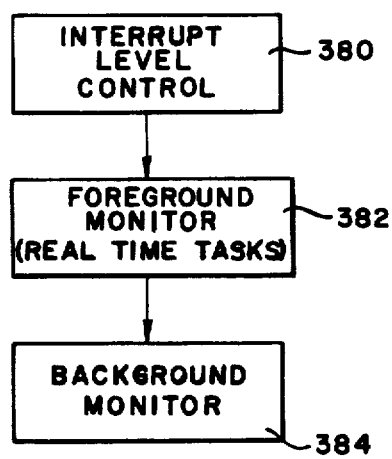

FIG. 5

| CYCLE | INPUTS ANALOG | DISCRETE | OUTPUTS |
|---|---|---|---|
| 0 | N1, N2, Wf, PT3, TCZ, PT7, TCG, TT4.5, HOT | TCC | EGT, TT3, TT4.5, HOT, N1, N2 |
| 1 | Wf, PT2, PS4, EGT, TT3, SVA, BP, EPR | TCAC | Wf, SVA, PT3, PT7, PT2, PS4 |
| 2 | N1, N2, Wf, PT3, TCZ, PT7, TCG, TT4.5, HOT | TCAH | BP, EPR, ESN1, ESN2, DIS, STATUS |
| 3 | Wf, PT2, PS4, EGT, TT3, SVA, BP, EPR | FHV | SPARE |
| 4 | N1, N2, Wf, PT3, TCZ, PT7, TCG, TT4.5, HOT | FRZ | SPARE |
| 5 | Wf, PT2, PS4, EGT, TT3, SVA, BP, EPR | RPL | DRAM DATA TEST WORD |
| 6 | N1, N2, Wf, PT3, TCZ, PT7, TCG, TT4.5, HOT | | DRAM DATA CMD WORD |
| 7 | Wf, PT2, PS4, EGT, TT3, SVA, BP, EPR | | DRAM DATA EAROM DATA |
| 8 | N1, N2, Wf, PT3, TCZ PT7, TCG, TT4.5, HOT | | DRAM DATA EAROM DATA |
| 9 | Wf, PT2, PS4, EGT, TT3, SVA, BP, EPR | | DRAM DATA EAROM DATA |

20 MILLSEC. (cycle 0 to 1)
200 MILLSEC. (cycles 0–9)

FIG. 6

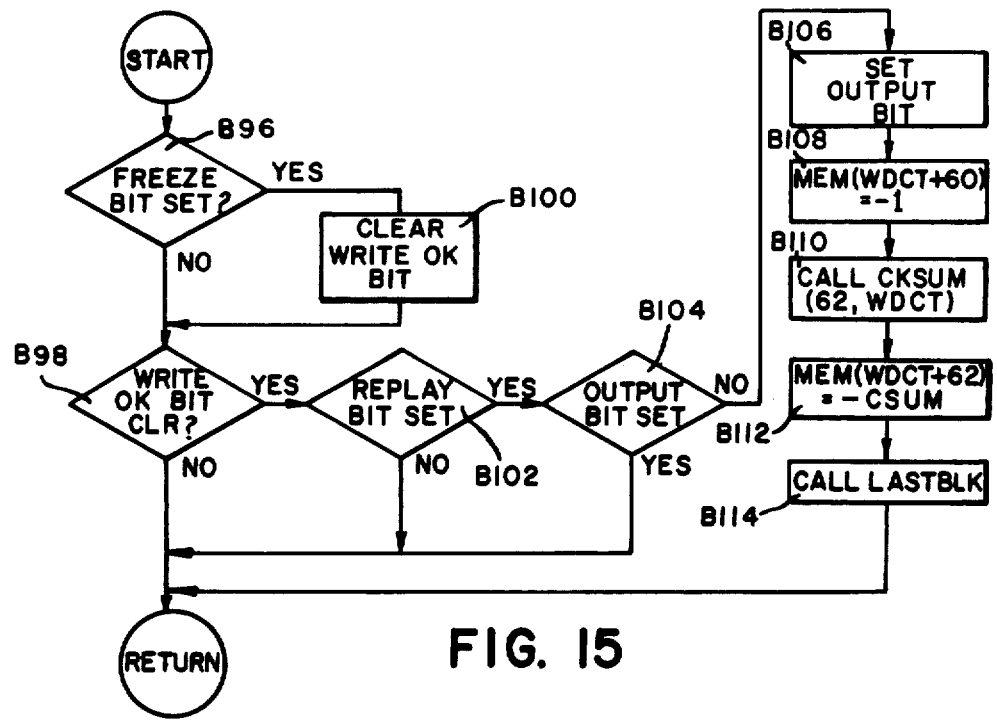
FIG. 15
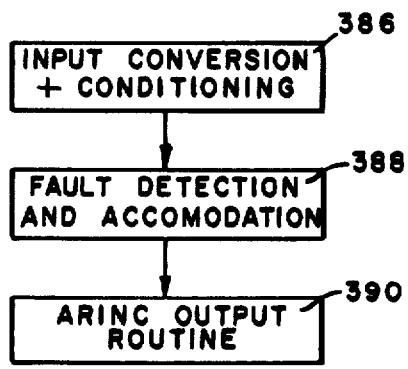
FIG. 7a
| PARAMETER TABLE | |
|---|---|
| EGT | X |
| TT3 | X+2 |
| TT4.5 | |
| HOT | |
| N1 | |
| N2 | |
| Wf | |
| SVA | |
| PT3 | |
| PT7 | |
| PT2 | |
| PS4 | |
| BP | |
| EPR | |
| ESN1 | |
| ESN2 | |
| DIS | |
| STATUS | X+34 |
FIG. 7b

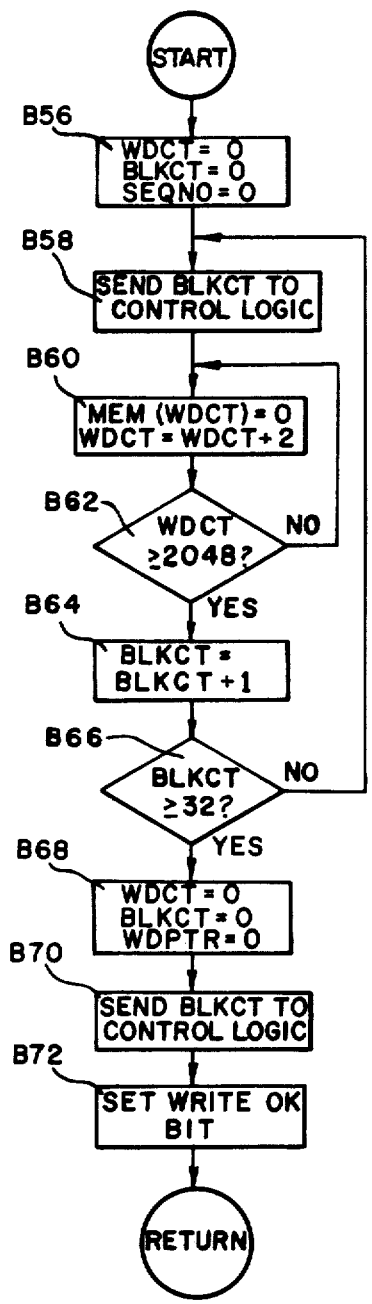
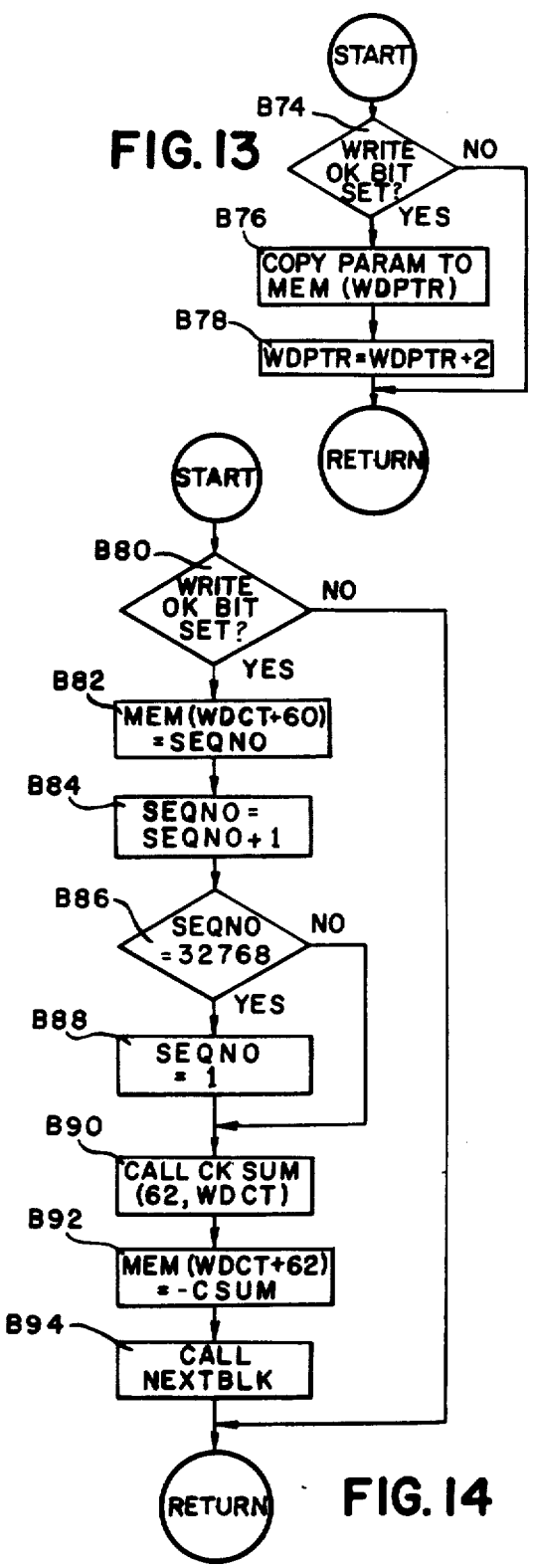
FIG. 12
FIG. 13
FIG. 14

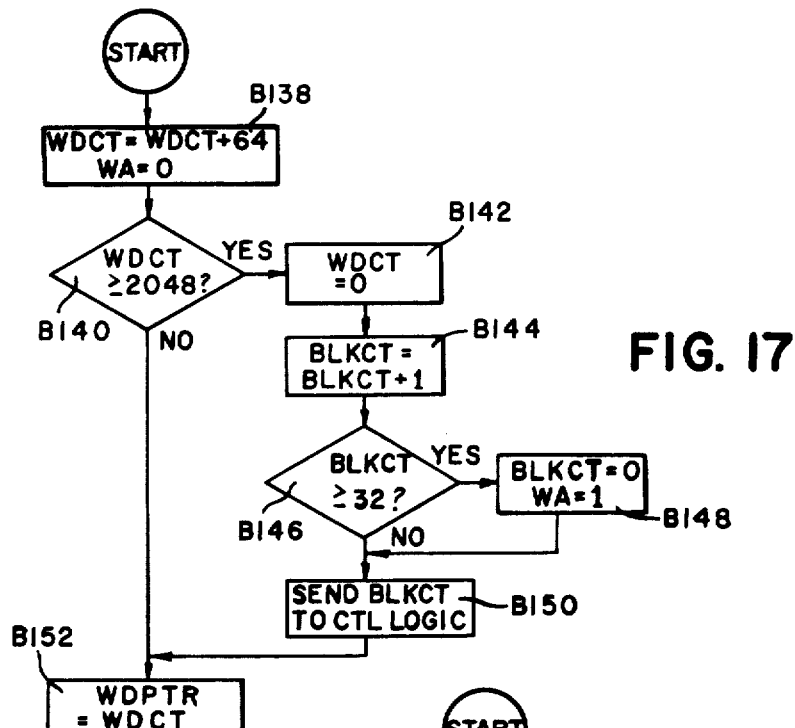
FIG. 17
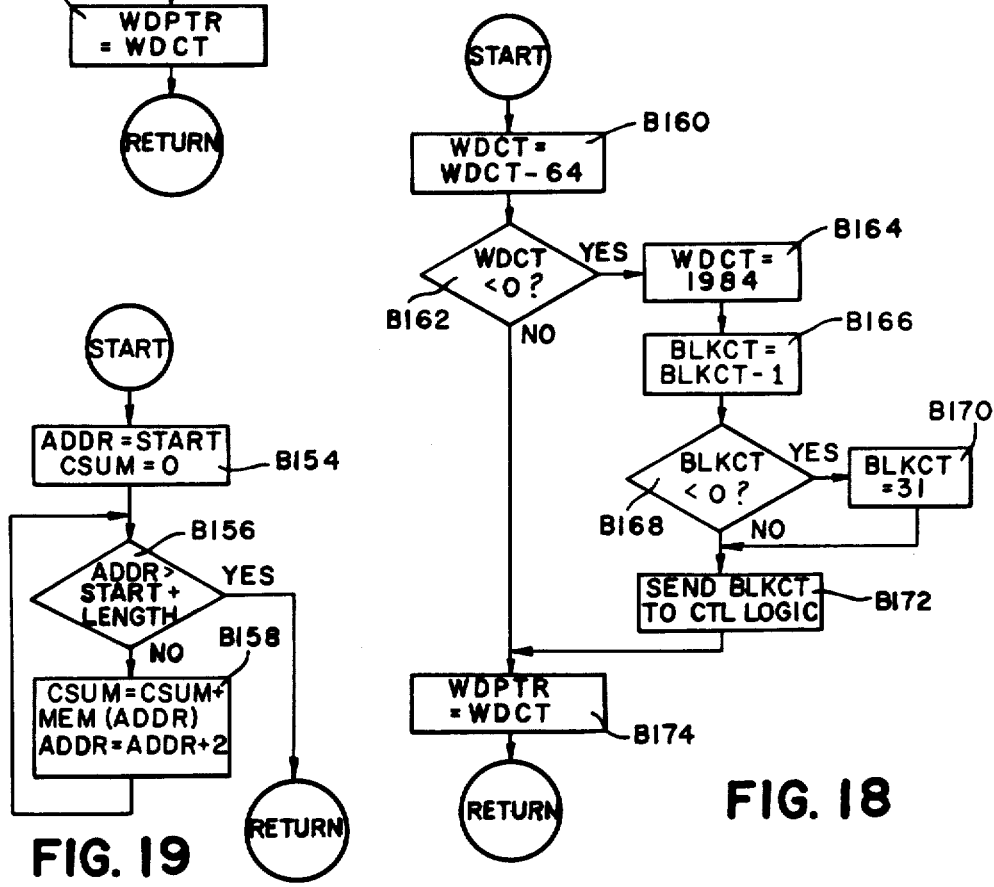
FIG. 18
FIG. 19

REAL TIME RECALL FEATURE FOR AN ENGINE DATA PROCESSOR SYSTEM

The invention relates generally to an engine data processor system for the inflight recordating of engine operating parameters and is more particularly directed to a real time recall feature for such systems.

The inflight recording of engine operating parameters for gas turbine engines has been desired for many years by both military and commercial operators of jet aircraft. This data is useful in scheduling the proper maintenance on the engines and, more importantly, possibly diagnosing impending engine failures before they occur. The early detection and warning of potential failures for engine components can reduce or eliminate secondary engine damage. By knowing the actual operating conditions under which an engine has flown, an automatic derating schedule for an engine can be established thereby reducing the severity and frequency of engine repair. Additionally, from such information a long term calculation of engine operation can be derived to provide a basis for the ongoing revision of engine maintenance criteria. Engine operating data can also be advantageously used in the design and qualification of new engine models. The recordation of inflight data thus lends itself to improving the quality, reliability, and maintainability of gas turbine engines for jet aircraft.

Until recently, inflight data gathering for jet aircraft was cumbersome and expensive. The number of parameter sensors needed to collect an accurate picture or profile of an engine in flight and the means for decoding and transmitting each parameter from the engine to an airframe mounted recorder was overly complex and added a considerable amount of weight to each engine installation. When the complexity of each engine installation is multiplied by the number of engines on a modern aircraft, the cost of obtaining the inflight data profiles, although extremely valuable, tends to become prohibitive.

Now there has been developed an engine data processor which is compact enough to be mounted directly on an engine in the nacelle and perform an initial data monitoring function prior to permanent recordation. Once the data processor has monitored the operating parameters in real time, the data is digitalized, reformatted, and subsequently transmitted by a serial data link for recordation to an airframe mounted recorder. The airframe mounted recorder can have a multichannelled input multiplexer and receive monitored data from several engine mounted data processors. By multiplexing the operating inputs from the engine sensors and reformatting the data before serial transmission, highly accurate records of the engine operation can be obtained at a minimum of cost, complexity, and weight. Multiplexing the outputs of several of the data processors further reduces the cost and complexity of the overall information gathering system.

The engine data processor generally monitors engine parameters by interrogating each sensor during a particular cycle type of a frame and then buffers and reformats the data for serial transmission at another cycle time of the frame. One of the problems that this causes is the amount of data available for permanent recording. If the data gathering and transmission cycles are made very short to increase accuracy, and the information transmission rate is high, extremely large quantities of data can be generated but only at an increased cost for the permanent recordation and evaluation of the data. Therefore, the rate for recording a permanent record is a trade off between the cost of providing a permanent record and evaluating the data and the amount of data really needed for an intended purpose such as maintenance, diagnostics, fault protection, etc.

Thus, the permanent data recordation rate is set such that a permanent recordation of an engine profile takes place efficiently even if it is substantially below the transmission capacity of the data processor. Normally, this recordation rate is on the order of 400 sec./frame of permanent storage. While very efficient for most of the operations of the engine monitoring system, there are special events for which an instantaneous or more recent picture of the engine operating parameters are desired and needed.

Conditions where an instaneous profile would want to be captured are at abnormal or unforeseen operational times identified by the pilot. Such conditions could include flameouts, surge, or iceing conditions, and ingestion problems from foreign objects or weapons exhaust. A recent engine profile would also be advantageous if sent as an indication of an automatically sensed alarm such as the engine exceeding an operation limit. Moreover, for test conditions such as flying out of the normal flight envelope or during takeoffs and landings, and increased number of engine profiles would be useful. For these unforeseen events between normal permanent record cycles, a picture of the engine although available from the data processor, will be lost unless some additional means is used for collecting the transient data and making it available to the airframe mounted recorder. However, the unforeseeability of these events is a problem that prevents the normal recording frame rate from being adjusted to capture them.

Therefore, it would be advantageous to provide a means for capturing an engine operating profile or a recent set of them at a particular time in response to an operator command and a means for transmitting the captured information in response to an operator command to the permanent recording apparatus. This operation would be advantageous because the operator can choose the timing of the event to be captured and thus which event is captured. Additionally, such operation would allow the operator to choose the iteration rate of sampling the profiles and recordation of these events without interfering with normal engine data accumulation. The special record captured would contain only that information wanted and not include extraneous information to sift through before finding the abnormal event record.

Accordingly, the invention provides a real-time recall feature for an engine data processor where a particular set of engine data profiles can be captured during a special event and then replayed on command at the same or a later time.

The engine data processor comprises an input control that reads and stores engine parameters from a plurality of sensors, a fault detection and accommodation means that checks the data and the processor hardware, and an output means that coordinates the reformatting and output of the parameters in engine profile form over a serial data transmission line to a permanent recording device.

The recall feature includes an auxiliary memory and software-driven controlling means for storing a set of engine profiles in that memory on a real-time basis. In the preferred implementation, a dynamic random access memory (DRAM) is used to store engine data profiles at the output rate of the engine data processor. A DRAM is chosen for the auxiliary storage because of its low cost and weight in relation to the amount of storage capacity available.

The auxiliary memory size is increased without the necessity of reserving a large section of the working memory space by a hardware paging technique. The pagination is accomplished by providing a DRAM address multiplexer connected to the communication register unit (CRU) of the control processor. The outputs of the multiplexer, which are serially set by software commands, are connected to the higher order address lines of the memory and thereby segregate the memory into hardware pages. The lower order address lines of the memory are connected to the address bus of the control processor for normal memory access. The number of lower order address bus lines dictate the page size and the amount of working memory space necessary for reservation. The reserved space which is accessed in a normal memory cycle is reused by other hardware memory pages by first setting the desired page code on the DRAM address multiplexer outputs serially via the control processor output data line CRUOUT.

In the illustrated implementation the processor output timing is based on a frame rate which is divided into a number of subcycles. The processor outputs a plurality of data parameters in one subcycle and uses several subcycles for the output of a complete engine profile. Before each parameter is output, it is additionally logged in the DRAM in a memory block. An entire engine profile is stored in this manner during the several output subcycles of each frame. A profile is finished during a later subcycle by writing a word containing a sequence number into the memory and a word containing the negative of the checksum of the entire contents of a block. The sequence numbers start at +1 and are positive increasing numbers which restart at a +1 when the maximum profile count is exceeded.

The DRAM is sectioned in multiple blocks where each engine profile occupies one block. Successive profiles are entered or logged into the memory by blocks in ascending address order. When the memory is filled, the control means continues the logging process by wrapping back to the start of the auxiliary memory thereby overlaying the oldest engine profile stored with the newest. This is the normal or logging mode of operation where engine profiles are logged continuously, with a plurality of the newest profiles always available, until a special event occurs which the operator desires to capture.

The recall feature includes means for sensing a capture or freeze signal indicating that the stored profiles should be captured. When this signal is given to place the system in a capture mode, the means for controlling the DRAM are used to prevent further storage of information into the memory while not interrupting normal data transmission of the processor to the airframe mounted recording apparatus. A sequence number of a −1 is placed in the next block of the memory to flag the place where the memory was frozen.

The recall feature also includes means for sensing a replay signal indicating that the stored profiles should be output either to the permanent recording apparatus or to a cockpit display. When this signal is given to place the system in an output mode, the controlling means unloads the DRAM through the output means in a last-in, first-out fashion. After the controlling means has output a profile, it places a 0 in the sequence word of that block to indicate the task has been accomplished. The controlling means, after it unloads the entire DRAM, will then clear the write protection enforced on the memory by the freeze signal so that the normal logging cycles can continue.

The controlling means of the recall feature further includes means for restarting the DRAM memory in any of its three modes of operation (logging, capture, or output) after a power loss or other type of program interruption. The restarting means examines the sequence numbers of the memory blocks to determine which mode of operation was occurring and which block was being operated on when the system was interrupted.

For the logging mode, each block is searched for an ascending order of sequence numbers and the restarting means stops when it finds the last block written into or the highest sequence number. For a read-out mode of operation, a sequence number equal to a −1 and preceded by memory blocks with zero sequence numbers, indicates the memory was in this mode of operation when interrupted. Once the restarting means determines there was a readout mode, the blocks previously read out are searched in decending order for the first nonzero sequence number to find the last block which was output. For a capture mode of operation, a sequence number equal to a −1 and proceeded by a memory block with positive sequence number indicates the memory was in this mode of operation when interrupted. Finding that mode, the restarting means will stop at the block where the memory was frozen, the block with a sequence number of −1. After the restarting means determines the mode and block at which the operation was interrupted, the control of the DRAM can be returned to the normal sequence such that the operations can be continued from that point.

These and other objects features and aspects of the invention will be more clearly understood and better described if a reading of the following detailed description is undertaken in conjunction with the appended drawings wherein:

BRIEF DESCRIPTION OF THE DRAWINGS

FIGS. 4b, 4c, 4d, and 4e are waveform diagrams of control signals performing read and write operations for the DRAM illustrated in FIG. 2;

FIG. 5 is a system level flow chart of the major sections of the software control program for the data processor illustrated in FIG. 1;

FIG. 6 is a pictorial tabular representation of the inputs and outputs of particular engine operating parameters during the subcycle times of the engine data processor illustrated in FIG. 1;

FIG. 7a is a system flow chart of the major tasks of the foreground monitor illustrated in FIG. 5;

FIG. 7b is pictorial representation of a plurality of output parameters stored in a table located in the random acess memory illustrated in FIG. 2;

FIG. 12 is a detailed flow chart of the subroutine INIT illustrated in FIG. 11;

FIG. 13 is a detailed flow chart of the routine COPY illustrated in FIG. 7c;

FIG. 14 is a detailed flow chart of the routine FINISH illustrated in FIG. 7c;

FIG. 15 is a detailed flow chart of the routine CONTROL illustrated in FIG. 7c;

FIG. 17 is a detailed flow chart of the subroutine NEXTBLK illustrated at various locations of FIGS. 11-16;

FIG. 18 is a detailed flow chart of the subroutine LASTBLK illustrated at various locations of FIGS. 11-16; and FIG. 19 is a detailed flow chart of the subroutine CKSUM illustrated at various locations of FIGS. 11-16.

DETAILED DESCRIPTION OF THE PREFERRED EMBODIMENT

Figure 1:
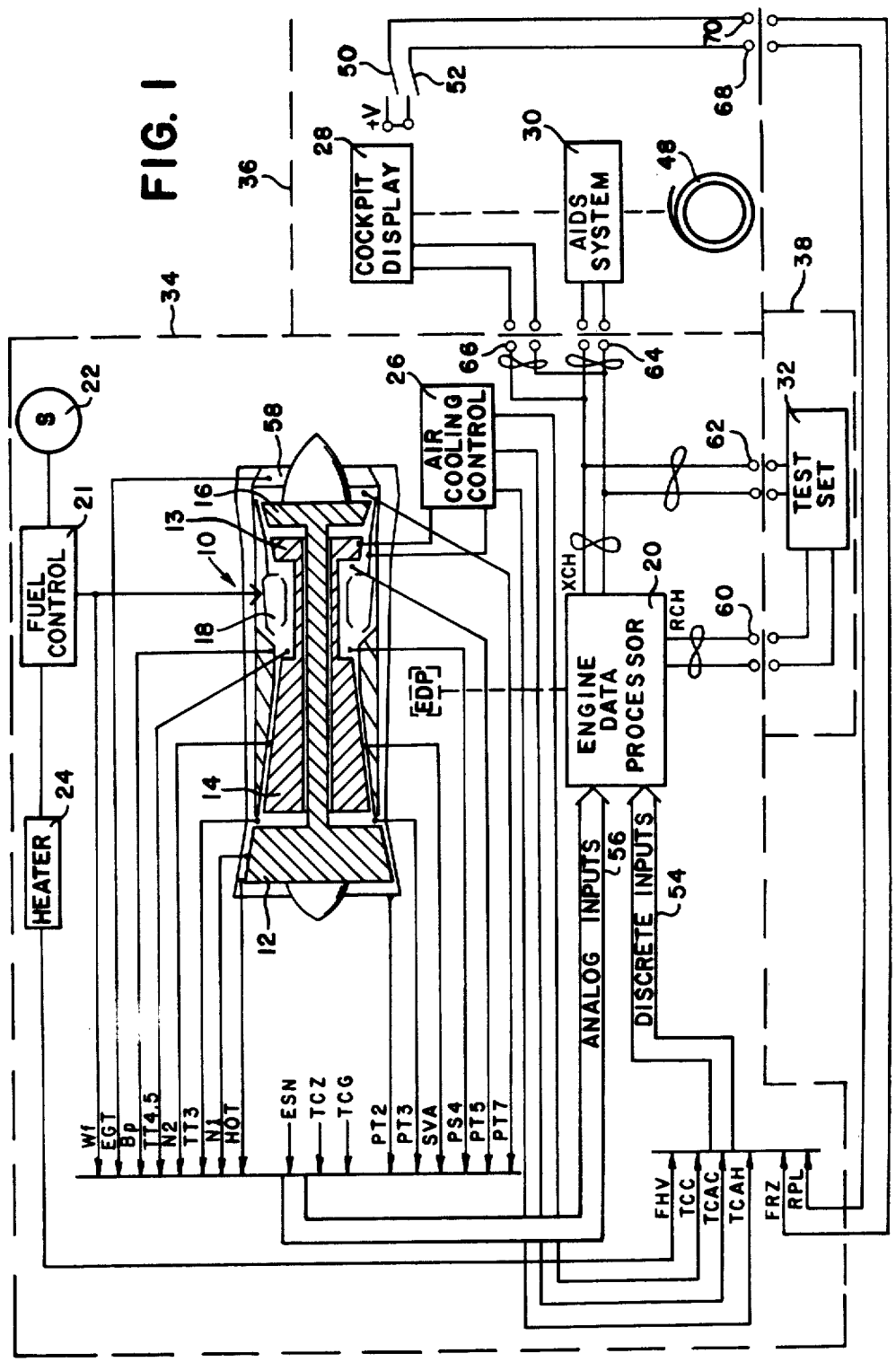
FIG. 1 is a partially cross-sectioned system block diagram of a gas turbine engine and an engine data processor including a real-time recall feature constructed in accordance with the invention.

In FIG. 1 there is illustrated a gas turbine engine 10 which has associated therewith a engine data processor (EDP) 20. The engine data processor 20 is within the nacelle of the engine compartment on an aircraft (illustrated as dotted area 34) and provides for the inflight data acquisition of the operating parameters of the engine. Because of this engine mounted position at the location shown on the engine casing, the engine data processor 20 may sample a plurality of outputs from the engine sensors without the necessity of a number of complex and costly interfacing, signal conditioning, and transmission circuits. The operating parameters of the engine are input to the EDP 20 at a predetermined sampling rate through either analog input channel(s) 56 or discrete input channel(s) 54, depending upon their form. From these parameters, the EDP 20 builds an engine data profile describing the operating condition of the engine at a particular point in time.

The data which the engine processor 20 acquires is tested and reformatted before being output on an external transmission channel XCH to a permanent recording apparatus 30 mounted in the airframe of the aircraft as shown by the dotted area 36. The output of the engine data processor 20 is at a particular cyclic output rate which is synchronized with the recording apparatus 30. The airframe mounted recording apparatus can generally consist of any of a number of permanent recording devices, but preferably comprises an aircraft integrated data system (AIDS) which receives the transmitted information from the transmit channel XCH through connector 64 and provides permanent recordation of the information on a medium such as magnetic tape 48.

In a multi-engine aircraft the transmission channel XCH would be one of several similar inputs from other EDPs connected to separate ports of an input multiplexer of the AIDS system 30. Alternatively, the information provided on the transmission channel XCH can be made available to operating personnel of the aircraft by a cockpit display 28 either directly with a parallel link of the data channel XCH through connector 66 or indirectly by a data transfer from the AIDS system 30.

The engine data processor additionally includes a real time recall feature under control of the operating personnel of the aircraft. Provision for operating personnel control input is provided by two switches 50 and 52 which regulate the recordation or display of specific engine data profiles of the recall feature at the particular times desired by the aircraft crew. Switch 50 is used to generate a logic signal FRZ indicative of a request to capture engine profile(s) at some particular point in time when an abnormal envent is occurring. The freeze signal FRZ is transmitted from the cockpit or other operator area via connector 70 to the engine data processor 20 through the discrete input channel 54. Likewise, switch 52 is used by operating personnel to generate a signal RPL which is indicative of a desire to replay the captured engine profile(s) and is also input via connector 68 to the engine data processor 20 through the discrete input channel 54. Depending upon the intended use of the engine profile(s) that have been captured by the FRZ signal, upon receiving the RPL signal the engine data processor 20 will either transmit the information over the external transmission channel XCH to the AIDS system 30 or the cockpit display 28 for subsequent interpretation.

While there has been shown operator generated signals from the switches 50, 52, it should be evident that the signals FRZ, RPL are logic level control signals which could just as easily be generated by automatic means such as alarm circuits or the like.

The type of engine with which the engine data processor 20 is usually associated is a gas turbine engine 10 of the turbofan type having a low pressure compressor 12 and a high pressure compressor 14. The compressors are rotated by a high pressure turbine 13 and a low pressure turbine 16 powered from the energetic gases developed by burning fuel from a fuel control 21 with an incoming air flow from the compressor stages in burners 18. The energy not used in compressing the input air is used as a thrust to drive the aircraft by means of nozzle 58. Since the gas turbine engine is a thermodynamic machine, the operating condition of the engine can be basically described by a number of pressures and temperatures. Further, important operating parameters are those which relate to the positions or the configurations of the compressor geometries and the amount of fuel delivered to the engine. By recording an engine data profile from these parameters and others, the engine data processor can be useful in testing, designing, maintaining, diagnosing, or fault protecting the engine and aircraft.

Many of the operating parameters are analog in nature and are read into the engine data processor 20 through the analog input channel 56. Analog inputs to the processor for the implementation shown include the fuel flow, WF, measured by a flow meter in a conduit connecting the burners 18 with the fuel control 21; the exhaust gas temperature EGT, measured by a thermocouple located downstream of the output of the low pressure turbine 16; the position of the compressor bleed valves BP, measured by a potentiometer; the temperature of the gas discharge of the high pressure compressor TT4.5, measured by thermocouple at that position; the speed of the high pressure compressor N2, measured by the tachometer; the temperature of the gas discharge of the low pressure compressor TT3, measured by thermocouple; the speed of the low pressure compressor N1, measured at that position by a tachometer; the hydraulic oil temperature HOT, measured by a thermocouple; the inlet pressure to the engine PT2, measured by a pressure transducer; the discharge pressure from the low pressure compressor PT3, measured by a pressure transducer; the position of the stator vanes for the high pressure compressor SVA, provided by a resolver; the discharge pressure of the high pressure compressor PS4, measured by a pressure transducer; the inlet pressure to the high pressure turbine PT5, measured by a pressure transducer; and the output discharge pressure of the low pressure turbine PT7, measured by a pressure transducer.

The analog input channel 56 is also used to input the value of two reference signals TCZ, TCG, generated internally in the EDP 20 which are voltages indicated of a zero and ground reference, respectively, for the thermocouple inputs. The last analog input ESN is a multibit input from a hard wired resistor network that indicates the engine serial number of the particular engine of the aircraft from which the engine data processor 20 is reading a profile.

Additionally, a number of discrete signals, in which the state of the signal is an indication of a certain condition, are read into the processor through the discrete input channel 54. The first signal in this discrete group is the signal FHV. This signal is from the fuel heater 24 and indicates whether the fuel heater valve is opened or closed. The next three signals in this group TCC, TCAC, TCAH, are from an air cooling control 26 which controls cooling air to the turbine case and to the turbine blades of the high pressure turbine 14. The first signal, TCC, indicates whether the turbine cooling valve to the turbine blades is open or closed and the second and third signals TCAC, TCAH, indicate whether the turbine cooling air to the turbine case is open or closed, or half open or not half open, respectively.

In addition to communicating with the AIDS system 30 or the cockpit display 28, the engine data processor 20 also has means to communicate with a test set 32 when the aircraft is on the ground. The interface between the engine compartment or nacelle 34 and an area outside the engine compartment 38 is indicated by the dotted lines segregating the areas. The test set 32 is used outside the engine compartment by test personnel to receive and transmit information to the engine data processor 20 for maintenance purposes.

The engine data processor 20 connects to the test set 32 through an external receiving channel RCH via connector 60 to input commands from the test set 32 indicative of an number of operations to be accomplished. The input commands produce information on the transmit channel XCH via connector 62, which are displayed and recorded by the test set 32 for evaluation by the test personnel. As will be more fully explained hereinafter, a test command may be used to read certain areas in a random access memory RAM for real time tests of the operating parameters or areas in an electrically alterable read only memory EAROM which is utilized as a nonvolatile store for fault data.

Figure 2:
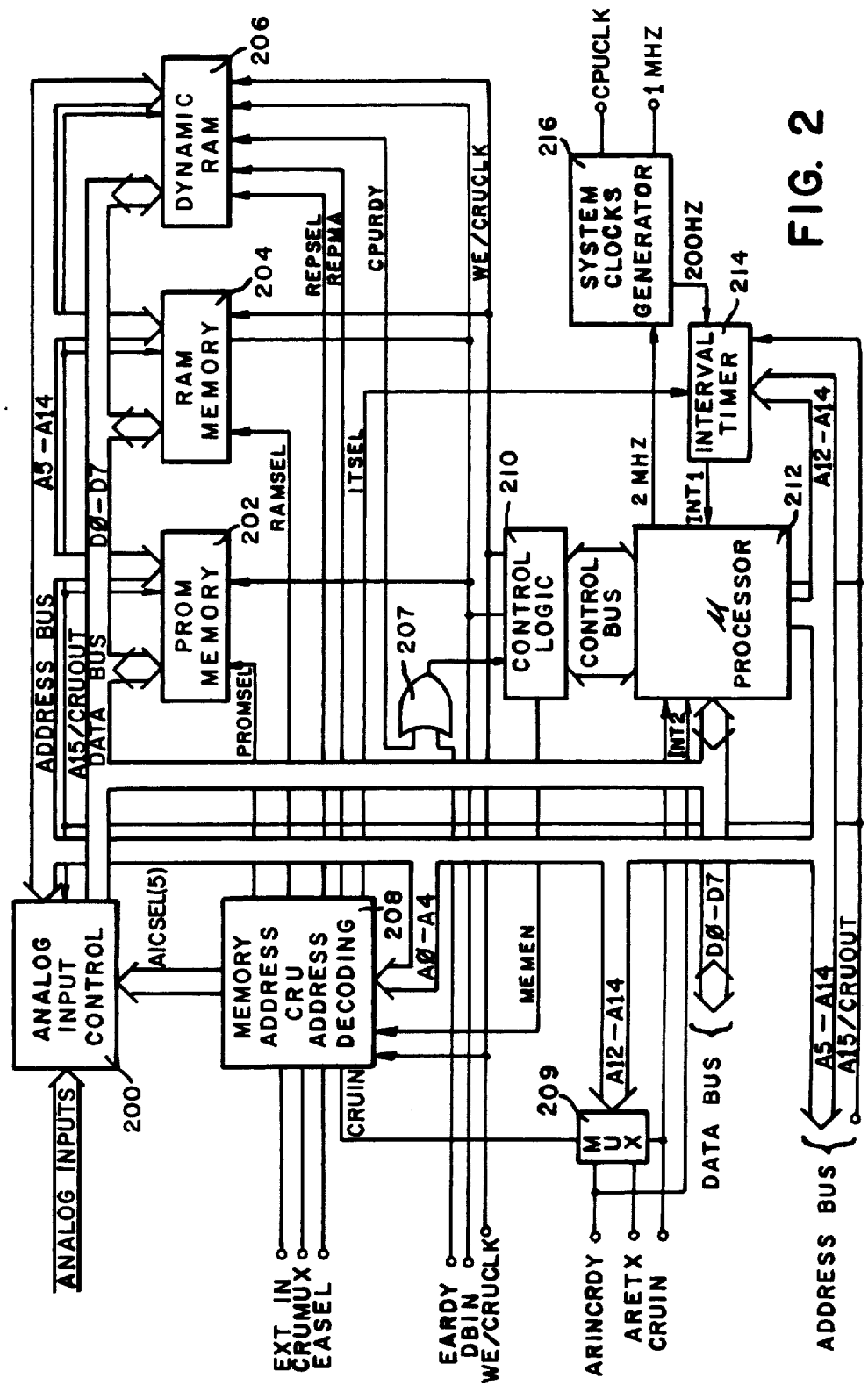
FIGS. 2 and 3 together form a detailed block diagram of the architecture of the peripheral devices, bus structure, and control microprocessor for the engine data processor illustrated in FIG. 1.
Figure 3:
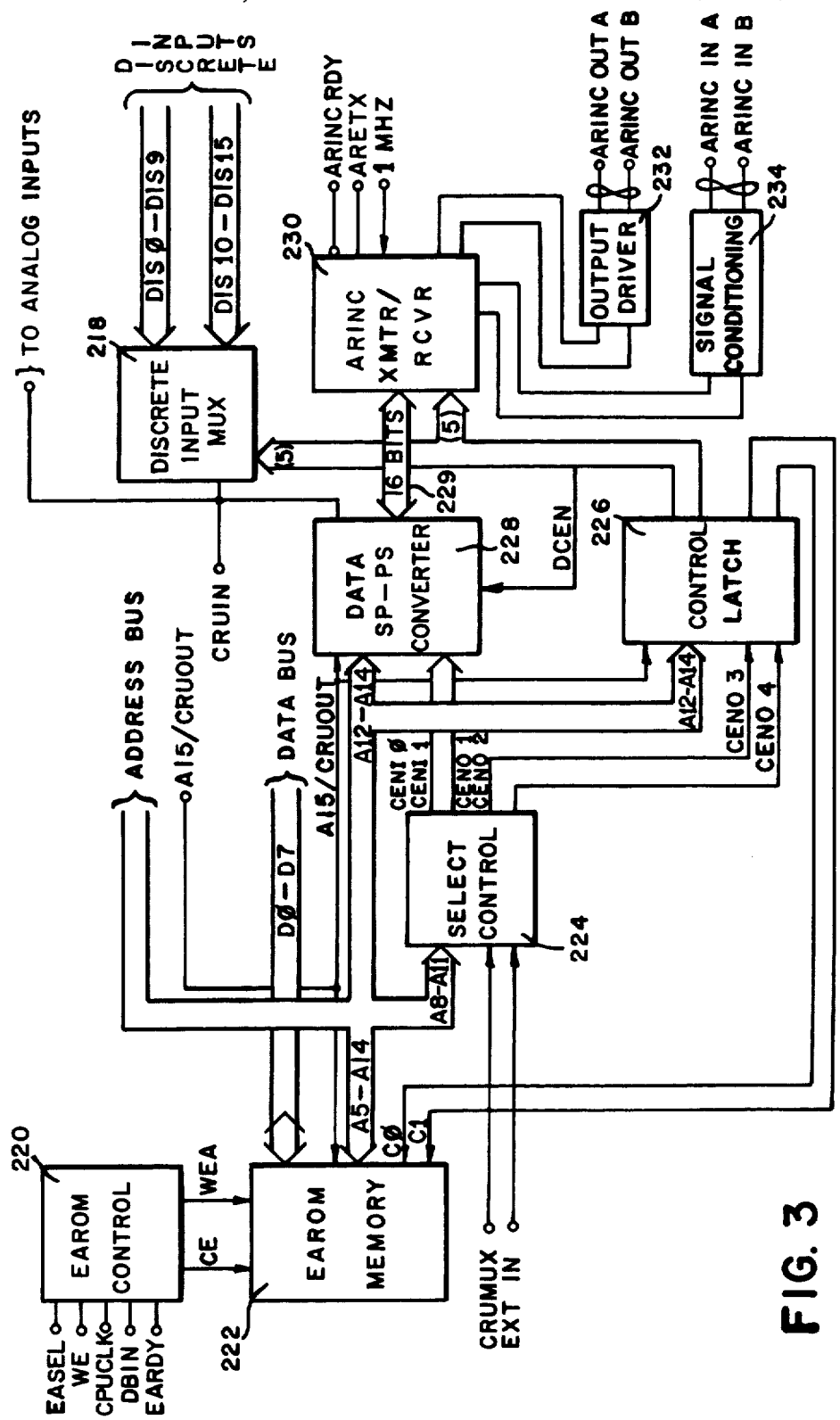

A more detailed block diagram of the engine data processor, 20 constructed in accordance with the invention is shown in FIGS. 2 and 3. The engine data processor is essentially a programmed information controller including a microprocessor device 212, a programmable read only memory (PROM) 202, a random access memory (RAM) 204, and other appropriate control, decoding, communication and special memory circuitry. The microprocessor 212 communicaces with the PROM 202 and RAM 204 by means of an 8 bit bidirectional data bus having data lines D0–D7 and a 16 bit address bus having address lines A0–A15. The lowest order address line A15 is also labeled CRUOUT, and is used as an output data line for serial data output from the microprocessor 212 through a communication register unit (CRU) internal to the device. The CRU of the microprocessor 212 additionally includes a serial input data line CRUIN from which serial data can be input.

The microprocessor 212 operates under program control from a series of instructions stored in the PROM 202 which are transferred to the microprocessor 212 in fetch-execute cycles over the data bus. Scratch pad locations necessary for the intermediate storage of variables, calculation results, and table storage are provided by the RAM 204 and internal microprocessor registers. Instructions are read from the PROM 202 and data is read from and written into the RAM 204 under the regulation of control logic 210 connected to the microprocessor 212 by a bidirectional control bus 213.

The logic 210 develops a number of control signals to regulate the memory and peripheral devices for input and output. The control line from the logic 210 labeled DBIN regulates the direction that data flows to and from memory locations on the data bus. A logical zero for the signal DBIN indicates that data is to flow from a memory location to the microprocessor and a logical one indicates that data will flow from the microprocessor to the memory location. An additional control signal from the control logic 210 transmitted to the RAM 204 is the write enable signal WE which is negative true. The true write enable signal indicates when the RAM 204 or other memory is to be written into. The combination of a positive data bus in signal DBIN and a lower level WE signal indicates that data is to be transferred for storage in the RAM 204.

The PROM 202 and RAM 204 additionally receive selection signals from a memory address and CRU address decoding circuit 208. The PROM receives the enabling PROM select signal PROMSEL and the RAM 204 receives the enabling RAM select signal RAMSEL. The decoding circuit 208 decodes address information on address lines A0–A4 in combination with the memory enable signal MEMEN from the control logic 210 to generate the signals PROMSEL and RAMSEL. Depending on which device address is decoded, either the PROM 202 or the RAM 204 will be enabled by the select signals and read from, in the case of PROM, or read from or written into, in case of the RAM 204, in response to the control signals DBIN and signal WE.

By decoding the address lines A0–A4 and generating the select signals in conjunction with the memory enable signal MEMEN the system divides the addressable memory space of the microprocessor into known regions. This memory space addressing scheme is common to microprocessor-type controls. Other devices may be memory-mapped in the space created by the address bus and can include other different memories and I/O devices. In this manner the address bus and the parallel bidirectional data bus are used to input to or output from the microprocessor bytes of data to and from the addressable memory locations. Since the implementation shown has a 16-bit address bus and an 8-bit data bus, the memory space is one byte×64K in size.

A serial communication scheme with memory, I/O devices, and other peripheral attachments to the microprocessor is also managed by the CRU of the microprocessor in a serial memory space or CRU space. The CRU memory space is one bit wide and uses the address line A15 as a serial output data line CRUOUT and a serial input data line CRUIN to input and output data one bit at a time to its locations. The write enable line WE from the control logic 210 additionally generates the clock signal CRUCLK for the serial memory space. Addresses are differentiated in one space from the other because a regular memory access uses the memory enable signal MEMEN to enable a selected area. Therefore, this arrangement provides a double memory mapping scheme of a serial memory space and regular memory space where locations may have the same address but exist in different areas of memory. As with the memory address selection lines, CRU device selection lines are provided by the decoding circuitry 208 to divide the CRU space into known regions. A microprocessor having this bus structure and communication ability is of a common type such as a TMS 9995 commercially available from the Texas Instruments Corporation of Dallas, Tex.

An analog input control 200 is used to convert the analog inputs from the sensors to digital numbers and input them through the data bus. The input control 200 receives from the address decoding circuitry 208 a number of select lines AICSEL (5) and control bits via the serial output data line CRUOUT to control the memory input process. The AICSEL (5) lines are a combination of memory space select signals and CRU space select signals.

Generally, the analog input control 200 can be envisioned as an analog-to-digital converter with a multiplexer having a plurality of input channels. For example, the sequence of input conversions can be initiated by performing a set bit command to a CRU address which is indicative of the particular channel in the input multiplexer that the microprocessor 212 desires to read. After the channel has been selected and allowed to settle, a conversion can be initiated by performing another set bit command to an address in CRU space to enable the analog-to-digital converter. Thereafter, the digital output from the A/D converter is read in by bytes over the data bus D0–D7 by addressing locations in regular memory space.

A system clocks generator 216 receives a 2 MHZ signal from the microprocessor 212 and buffers and divides it to generate a number of synchronous signals to peripheral devices at different frequencies. The generator 216 provides a CPUCLK signal as a buffered 2 MHZ clock, a 1 MHZ clock, and a 200 HZ clock. The 200 HZ signal drives an interval timer 214 which generates an interrupt INT1 at programmable intervals to the microprocessor. The interval is programmed under software control by loading an interval word from address lines A12–A14 in response to an interval timer select signal ITSEL from the decoding circuit 208.

A special interrupt signal to the microprocessor INT2 is generated from the ARINC RDY signal from an ARINC I/O device more fully described hereinafter. The ARINC RDY signal and its companion, the signal ARETX, from the ARINC I/O device are additionally read by the microprocessor through the serial input data line CRUIN which is connected to the output of a multiplexer 209. The selection signal CPUIN from the decoding circuitry 208 enables the device 209 and the microprocessor 212 chooses the signal selected by a code on address lines A12–A14.

Another portion of the regular memory space is reserved for a dynamic random access memory (DRAM) 206. The DRAM 206 is connected to the microprocessor via the address lines A5–A14 and the bidirectional data bus lines D0–D7. The memory 206 also receives a memory select signal REPSEL from the memory address decoding circuitry for enabling the DRAM for reading or writing. A CRU enabling signal REPMA is generated by the address decoding circuitry 208 to the DRAM to control five bits of CRU space via the output data line CRUOUT. These five CRU space bits form a page address word to allow an increase in the addressable DRAM size by the system. The control of the reading and writing of the DRAM 206 is provided by the data bus in signal DBIN and the write enable signal WE from the control logic 210. A CPURDY signal is returned to the microprocessor through OR gate 207 and the control logic 210 to halt processing during DRAM access.

Another portion of the regular memory space is reserved for an electrically alterable read-only memory EAROM 222 which is connected to the microprocessor 212 via the bi-directional data bus lines D0–D7 and the address bus lines A5–A15. The EAROM 222 is controlled for functional reading and writing by four control signals. The first two control signals, a chip enable signal CE and a write enable signal WEA are generated from a EAROM control circuit 220. The chip enable signal CE enables the EAROM 222 for reading and writing and the write enable signal WEA indicates whether data is to be read or written into the memory 222.

Because of the specialized timing needed for reading and writing data into the EAROM 222, the control 220 develops CE and WEA from the normal memory access signals DBIN and WE from the control logic 210 and the synchronous clock signal CPUCLK from the system clocks generator 216. The EAROM control 220 replies to the microprocessor via the OR gate 207 and control logic 210 with a signal EARDY to halt further processing until a memory operation has been completed and another can be started. The EAROM control is enabled by an EAROM select signal from the decoding circuitry 208.

The third and fourth signals received by the EAROM 222 are functional control signals C0, C1 which are indicative of the operation that the memory is to perform. Depending upon the state combination of these two bits, the memory will either perform a read operation, a write operation, a block erase operation, or a byte erase operation. The control bits C0, C1 are set in the different combinations by a control latch 226 which receives data input from the output data line CRUOUT, address selection signals A12–A14 from the address bus, and enabling signals CENO3, CENO4 from a selector control circuit 224.

The decoding circuit 224 receives two selection signals from the decoding circuit 208 to enable the signals CENO3, CENO4 to control latch 226. These two selections signals are the select serial multiplexer CRUMUX and the external input signal EXTIN. The select control circuit 224 also receives bit information from address lines A8-A11. From the input information on the address lines and the select signals, the decoding circuitry 224 controls the serial data input and output processes of the system. The select control decoding circuitry 224 generates the input enabling signals CENI0, CENI1 and the output enabling signals CENO1, CENO2, CENO3, and CENO4.

Serial data output and serial data input take place through a serial to parallel and parallel to serial shift register or converter 228. The converter 228 has a data output connected to the input data line CRUIN and has an input the address line A15 or the output data line CRUOUT. In addition to the serial input and output the shift register 228 also has a sixteen bit parallel input and output bus 229 which communicates with a ARINC transmitter receiver device 230. The converter additionally receives the enabling input signals CENI0, CENI1, the enabling output signals CENO1, CENO2, and the address lines A12-A14 along with a control signal DCEN from the control latch 226. In concert with the states and timing of these control and enabling signals, serial data input via the input data line CRUIN is shifted into a position where it can be output in 16-bit parallel form to the input buffer of the ARINC device 230. Conversely, a sixteen bit parallel output from the device 230 can be shifted out serially to the microprocessor via the output data line CRUOUT.

Input data to the microprocessor is also brought in via the serial input data line CRUIN from a discrete input multiplexer 210 which has the discrete signals DIS0-DIS9 input to the first ten of its ports and the engine serial number ESN representing discrete inputs DIS10-DIS15 input to the last five of its ports. The parallel discrete inputs are latched and shifted on to the input data line CRUIN under the control of three address selection lines and two control lines provided by the control latch 226. For the operation of reading in the engine serial members, the input data line CRUIN is also connected to one part of the analog input control 200.

The ARINC device 230 provides a convenient method of communicating with the external receiving and transmission channels RCH, XCH. The two output terminals of the device 230 are connected to the external output channel XCH through an output driver 232 by terminals ARINC OUT A,B . The external input channel RCH is received via terminals ARINC IN A,B. and through a signal conditioning circuit 234 which is connected to the input terminals of the device 230. Timing for the input and output of the data and control words via the sixteen-bit bus 229 is provided by the 1 MHZ clock signal from the system clocks generator 216.

The control logic for inputting and outputting the data from the processor 212 is provided by setting particular bits in the serial memory space which corresponds to the control signal lines of the control latch 226. A control word is used to determine the transmitter data rate and word length of the output of the device 230. The control word is strobed into a control register of the device from converter 228 in response to one control line of the latch 226. Through other control lines of the latch data, from the converter 228 is transferred to the transmitter memory of the device 230. The microprocessor 212 can then strobe the enable transmit line of the device 230 via the control latch 226 to transfer the data down the transmitter memory stack and out through an output buffer. The device 230 automatically reformats the input data words into a serial data format. The format used for this particular implementation is ARINC 429 serial data word format. The device replies to the microprocessor 212 with the signal ARETX when the transmitter stack is empty.

Incoming data words, such as the command word are fed into the circuit in ARINC 429 serial data word format over terminals ARINC IN A,B. In the device 230, the serial format word is changed into 16-bit word formats compatible with the converter 228. The device 230 signals the microprocessor 212 with the interrupt signal ARINC RDY when a received word is ready to be fetched by the system. The received word is read out of the receiving data buffer of device 230 to the converter 228 under program control. The data in the converter 228 is then transferred to the microprocessor via the serial input data line CRUIN.

A transmitter/receiver device 230 having the capabilities referred to above is preferably of the type HS-3282-8 model commercially available from the Harris Corp., Orlando, Fla.

Figure 4A:
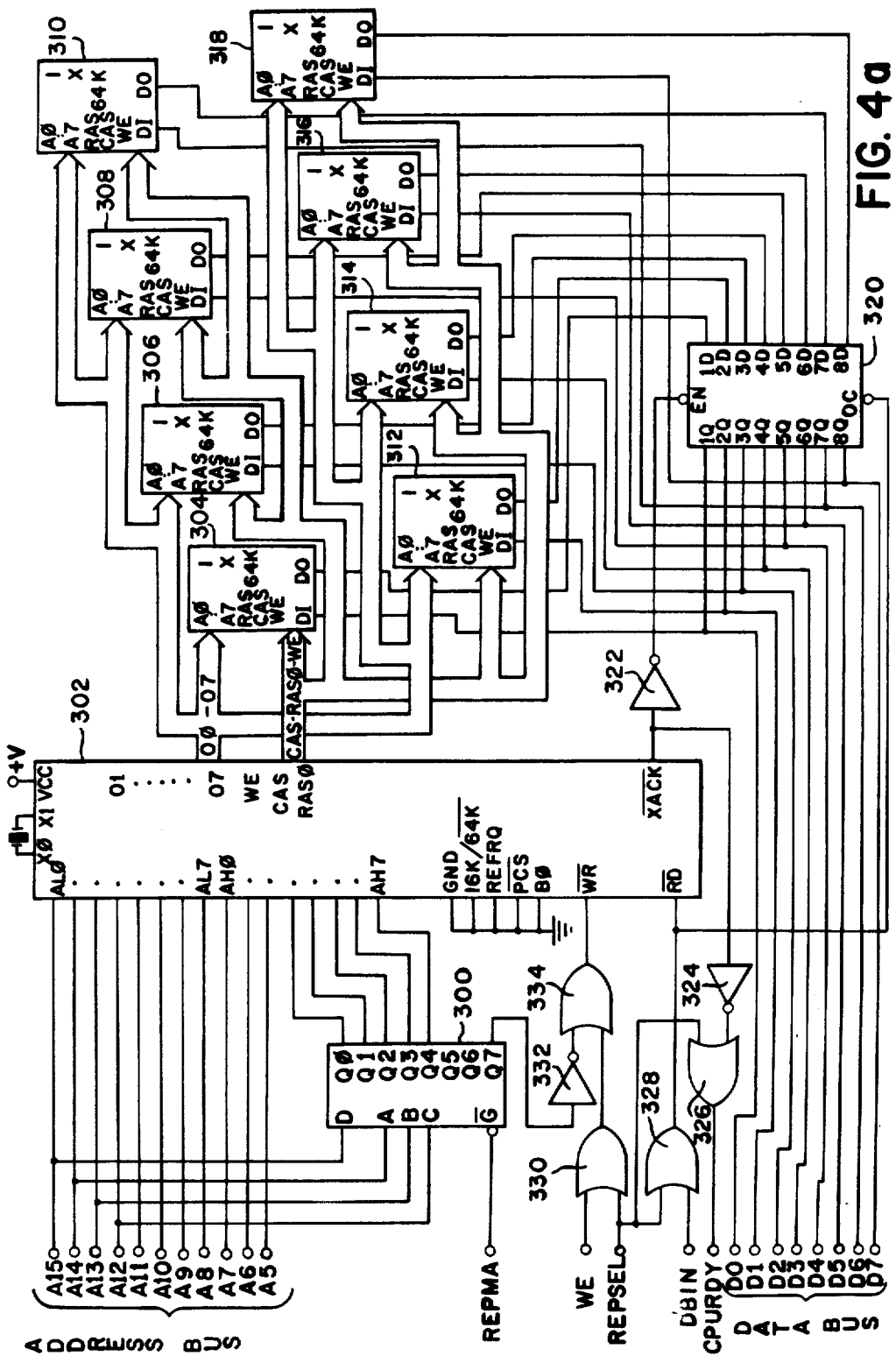
FIG. 4a is a detailed schematic diagram of the DRAM illustrated in FIG. 2.

The DRAM 206 is shown in more detail in FIG. 4 where a dynamic RAM controller 302 is operably connected to refresh an array of dynamic RAM chips 304, 306, 308, 310, 312, 314, 316, and 318. Each DRAM chip, for example chip 304, is $1 \times 64K$ bits in length. Thus, the eight chips in the array form a memory one byte wide and 64K in length. Each of the address inputs A0-A7 of the chips are connected to the outputs 01-07 of the controller 302. Further connection of the control inputs of the chips are provided by similarly labeled outputs of the controller 302. The write enable output WE of the controller connects to the write enable input WE of the chips. The column address strobe output CAS of the controller connects to the CAS input of the chips, and the row address strobe output RAS 0 of the controller connects to the RAS inputs of the chips, respectively.

The data input terminals DI of the dynamic ram chips are individually connected to the separate data lines D0-D7 of the data bus such that when the chips are in an input mode the data can be transferred directly into them. For output, the data output terminals DO are individually connected to separate inputs 1D-8D of a tri-state buffer 320. The buffer 320 also has output terminals 1Q-8Q which are individually connected to separate data lines D0-D7 of the data bus. For transferring data from the DO terminals of the DRAM chips 304-318, the tristate buffer includes an enable terminal EN which receives a transfer knowledge signal XACK from the DRAM controller 302 via a inverter 322 to latch data onto the Q outputs. The buffer 320 depending upon the state of the signal applied to its output control input OC will connect the Q terminals to the data lines of D0-D7 the data bus.

Input control of the DRAM controller 302 and consequently of the DRAM chips 304-318 is from the address bus lines A5-A15 connecting to the low order address inputs AL0-AL7 and the high order address inputs AH0-AH2 of the controller. The other high order address inputs AH3-AH7 of the DRAM controller 302 are provided by the Q0-Q4 outputs of a $1 \times 8$ multiplexer 300. The multiplexer 300 has its address selection inputs A,B, and C, connected to address lines A12, A13, and A14, respectively. Address line A15 or the serial output data line CRUOUT is connected to the data input D of the device, while its enable input G is connected to the memory selection line REPMA which originates from the memory address selection and decoding circuitry 208 (FIG. 2).

The multiplexer 300 provides 8 bits of CRU memory space which can be accessed by enabling the device with a CRU address that decodes into the REPMA signal. The particular bit addressed Q0-Q7, is selected by the outputs of address lines A12-A14. Whether the selected bit is set or cleared is determined by the state of the address line 15 during the CRU memory cycle while the REPMA signal is at an enabling value. In this manner, a 5-bit page word is generated which partitions the DRAM memory into 32 hardware pages of 2K length. Each hardware page is transparent to the regular memory space addressing and can be used interchangeably. Thus, the memory provides 64K bytes of memory while only taking up 2K of regular memory space.

The control inputs setting up the operation of the DRAM controller GND, 16K/64K, REFRQ, PCS, and B0 are all grounded. The write request inputs of the DRAM controller is controlled by the output of an OR gate 334 having one input from the Q7 output of the multiplexer 300 via an inverter 332 and the other input is from the output of an OR gate 330. The inputs to the OR gate 330 are from the control line carrying the write enable signal WE from the control logic and from the control line carrying the memory selection signal REPSEL from the address decoding circuitry 208 (FIG. 2). Similarly, the memory read request input RD of the DRAM controller 302 is regulated by the output of an OR gate 328 whose inputs are connected to the memory selection signal REPSEL and the control signal DBIN. The output XACK of the controller is connected to one input of an OR gate 326 through an inverter 324 whose other input is connected to the memory selection signal REPSEL. The output of the OR gate 326 generates a signal CPURDY to the microprocessor to halt processing state until the DRAM is ready to perform a particular command.

In operation the DRAM controller 302 operates to refresh the memory locations of the DRAM chips 304-318 by providing address strobes to the rows and columns of the array via the output lines O1-O7 at a predetermined cyclic time rate. Between the refresh cycles the memory may be written into or read from by means of the connections to the microprocessor. Initially for either type of cyle, the address lines AH-3-AH7 are set up by writing the CRU bits corresponding to Q0-Q4 of the device 300. The page address set in the device 300 enables a particular page length 2K to be read from or written into by the microprocessor during a normal access cycle. Thereafter, the microprocessor does a standard read or write operation as illustrated with reference to FIGS. 4a-c.

For a read cycle, (FIGS. 4d, e) the memory enable line is brought to a low level and the data bus in signal DBIN is additionally brought to a low state. The address on address lines A0-A4 is decoded into the DRAM select signal REPSEL to provide in combination with the data bus in signal DBIN a read request signal RD from the output of the OR gate 328. The low select signal REPSEL further drives the CPURDY signal low via OR gate 326 to put the microprocessor in a waiting state. The read request signal RD further is transmitted to the output control terminal OC of the tri-state buffer 320 to connect the the outputs of the device to the data bus lines D0-D7.

The address on inputs AL0-AL7 and AH0-AH2 is decoded for output to the DRAM chips in 8 bit bytes as the column address and the row address of the particular memory location to be read. The DRAM chips output the contents of the particular memory location chosen via the DO terminals to the 1D-8D inputs of device 320. The controller thereafter produces a pulse from the transfer acknowledge output XACK which enables the buffer 320 via the inverter 322 to transfer the data at its inputs onto the data bus lines D0-D7. The microprocessor will receive data on the data bus as valid at this time. The transfer acknowledge signal XACK also flows through the inverter 324 and OR gate 326 to disable the signal CPURDY thereby indicating that another read operation may take place.

A write operation (FIGS. 4b, c) of the DRAM memory takes place similarly by first setting up the particular hardware page from the outputs of the device 300 by setting bits in the CRU memory space. Additionally, the output Q7, of the device 300 is set such that a low level logic signal is provided by the output of the inverter 332. This write enable bit combined with the output of the OR gate 330, which is the logical combination of the control signal WE and the DRAM selection signal REPSEL, form a write request signal WR to the write request input of the DRAM controller 302. The low select signal REPSEL again sets the CPURDY signal low via OR gate 326 to halt the processor temporarily.

As was the case with the read cycle, the controller 302 outputs a column address and a row address via the O1-O7, CAS, and RAS 0 outputs. Additionally, the write enable inputs WE of the chips 304-318 are energized by the controller to take the data from data lines D0-D7 through the DI inputs into the memory. After the data has been input, the controller 302 acknowledges the operation with XACK signal through inverter 324 and OR gate 326 to disable the signal CPURDY.

Preferably, the controller device 302 and DRAM chip 304-318 are of the types models 8203, 2164, respectively, which are commercially available from the Intel Corporation of Santa Clara, Calif.

The overall software control of the engine data processor is shown in a functional flow chart in FIG. 5. The software architecture comprises an interrupt level control 380, a foreground monitor 382, and a background monitor 384. The interrupt level control handles initialization routines, and restart routines for an interrupted power conditions of the system software and further handles interrupts from the interval timer 214 to maintain the program on a real time basis. The interval timer provides an interrupt every 20 milliseconds to produce a real time window in which to complete a number of real time tasks.

The foreground monitor 382 which is started at the cycle interrupt, accomplishes the real time tasks within the given cycle time and further keeps a software cycle counter to provide a basic frame rate for inputs and outputs of the system. In the present implementation the frame rate is chosen as 200 milliseconds or ten 20-milliseconds cycles in length. In an individual cycle the program switches control to the background monitor 384 if the real time tasks of the foreground monitor are completed prior to the 20-milliseconds cycle expiring. Generally, the real time tasks are done by the foreground monitor 382 once every cycle and the background monitor 384 performs background tasks at a slower rate in a round robin fashion as time permits to finish the cycles.

The particular operating parameters input and output during each ten-cycle frame are listed in FIG. 6. All analog parameters are read into the processor at least once every other cycle and the discrete parameters are brought in one bit at a time during the first six cycles. For outputting the data, cycle times 0–2 are used such that six words are output during eacn cycle. The engine data processor, therefore, uses the first three cycle times of a frame to output an entire engine profile to the recording device. Other outputs from the system are provided during cycles 5–9 on request. Information stored in the DRAM is provided in response to the replay signal RPL during cycles 5–9 as will be more fully discussed hereinafter. Additionally, in response to the input of a command word from the ground-based test set, a test word from the RAM 204 is output during cycle 5, or information stored in the EAROM 222 is output during cycles 7–9. Cycle 6 is reserved to echo the command word which is inplut by the test set. Input of the command word is during the interrupt level control by means of an interrupt from the ARINC device 230 to the microprocessor 212.

The major real time tasks of the foreground monitor are illustrated in the order in which they are executed in FIG. 7. Initially, an input conversion and conditioning routine 386 is called to input the discrete and analog parameters via the input control 200 and MUX 218 during the cycles indicated in FIG. 6. Each input parameter is converted, scaled, and stored in a parameter table as shown in FIG. 7a as a 16-bit word. The parameter table contains that data which is indicative of a full profile for the engine at any point in time and is updated every 20 millisecs. It is noted that some of the table parameters are derived from combinations of input parameters. Particularly, the parameter EPR (the engine pressure ratio) is calculated by dividing the parameter PT7 by the parameter PT2. Additionally, the temperature parameters TT3, TT4.5, EGT, and HOT are functions of the input values from the thermocouples and the thermocouple zero and ground reference values TCG and TCC. The engine serial number words ESN1, ESN2 are BCD representations of a six digit value read in through the analog input control 200 one bit at a time during the background monitor time. The output variable DIS is a discrete word where particular bits are set or cleared depending upon the values of the discrete input signals.

After the input conversion and conditioning routine inputs the particular analog and discrete variables read during the present cycle, the program switches to the fault detection and accommodation routine 388 where the parameters are rate and range checked and certain fault and status bits set in a number of software flag words. The output table word STATUS is a combination of these fault flags and the results of the engine data processor self tests.

The last major task in the foreground monitor is the ARINC output routine 390. The ARINC output routine reformats the engine profile parameters and moves them from the parameter table to the input buffer of the ARINC device 230. (FIG. 3). The ARINC output routine thereafter controls the device 230 to output the parameters in the ARINC 429 serial data format at six words per cycle as previously explained in FIG. 6. The ARINC output routine 390 also accomplishes the task of loading the DRAM memory with current engine profiles and the task of capturing those profiles on command of the signal FRZ. The routine 390 further performs the task of outputting the captured profiles on command of the replay signal RPL. Finally, in response to the command word from the test set, the ARINC output routine outputs the test word, command word, and EAROM data at the particular times indicated in FIG. 6.

Figure 7C:
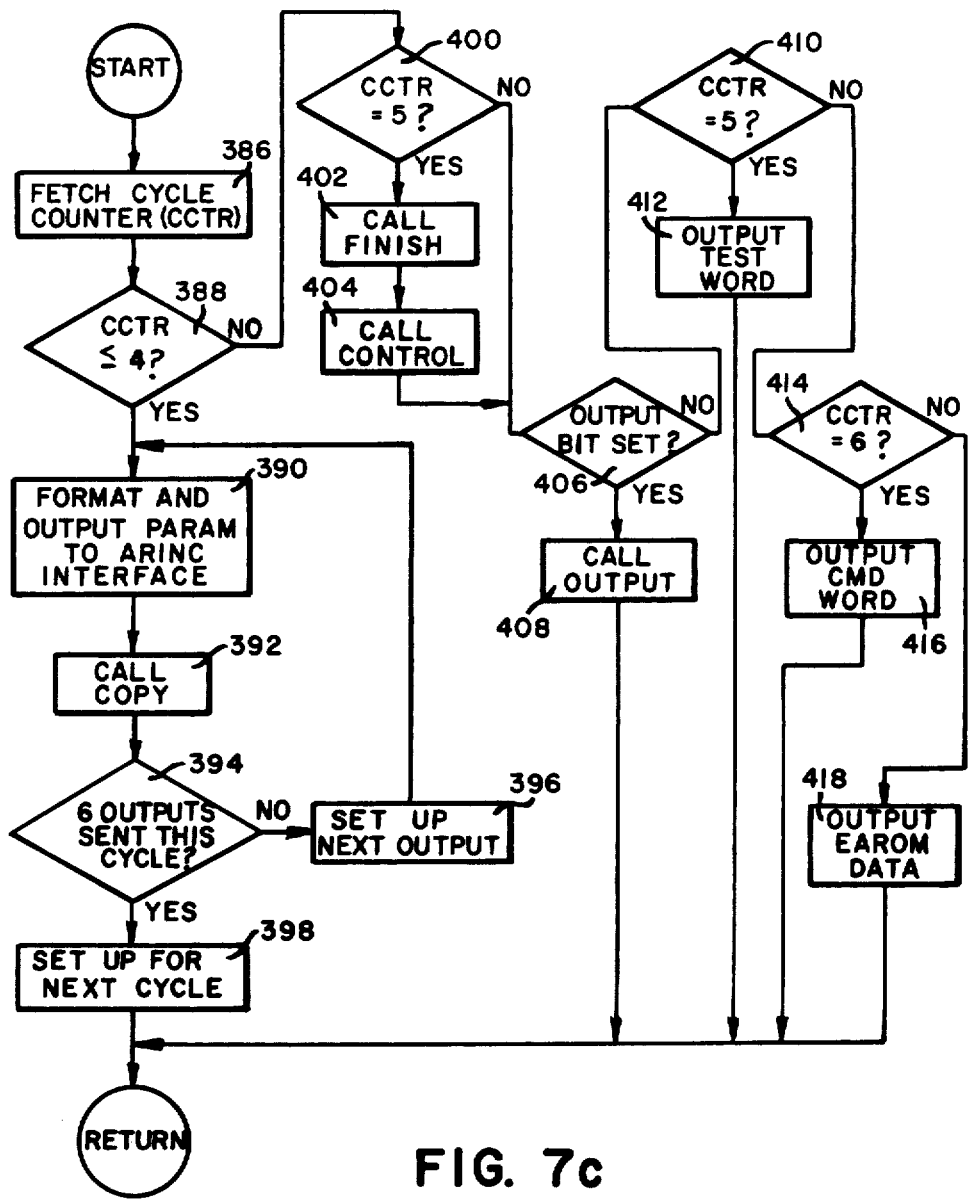
FIG. 7c is a detailed flow chart of the ARINC output routine illustrated in FIG. 7.

If attention will now be directed to FIG. 7c, a detailed flow chart of the ARINC output routine will be more fully described. The output routine starts in block 386 where the cycle variable CCTR is fetched from the cycle counter to determine where in the frame the processor is starting. Next in block 388, the variable CCTR is tested to determine whether it is less than or equal to cycle 4. It will be remembered that the first five cycles of the frame are reserved for outputting the eighteen parameter words to the airframe recording apparatus. The path for an affirmative answer to the test in block B388 is to execute block 390 where a parameter word is formatted from the parameter table and transferred to the ARINC interface. Under program control, the word in the interface is loaded to the buffer and subsequently to the transmitter stack of the ARINC device 230. From the transmitter stack it is sent out over the external output channel XCH in the serial format of the device.

The parameter chosen depends upon the cycle as indicated in FIG. 6 and the number of parameter words previously output during the present cycle. Each parameter is sent in the order indicated in FIG. 6 and during the time of its assigned cycle. For example, the ARINC output routine takes the parameter table found in FIG. 7a and outputs parameters EGT through N2 in order during the cycle 0 outputs parameters WF through PS4 in order during cycle 1, and outputs parameters BP through STATUS in order during cycle 2. Depending upon which parameter is chosen the 16-bit word from the parameter table is also stored in the DRAM memory by calling a routine COPY in block 392.

Next in block 394 the number of parameter words output is checked to determine whether the entire six for the cycle have been transmitted to the ARINC interface. If not, the program control shifts to block 396 where the program sets up the pointers and variables to pick up the next output parameter word. Tasks included in this block would comprise reading the next parameter in the list and incrementing the register that keeps track of the number of output words sent in the present cycle. Afterwards, the program returns to block 390 where the next output parameter is set to the ARINC interface and lodged in the DRAM memory. The loop continues until six output words have been sent to the interface and logged in the DRAM, at which time the program sequences to block 398 to set up variables and pointers for the next cycle. The program then returns to the foreground monitor where other real time tasks are completed or passes control to the background monitor to continue slower ordered tasks.

The program cycles through the output sequence until the sixth cycle, cycle 5, is present. When this occurs the test in block 388 is failed and the negative path taken to block 400 where the cycle variable CCTR is found equal to five. During cycle 5 control passes from block 400 to block 402 where the subroutine FINISH is called. The subroutine FINISH completes the memory block in the DRAM memory by providing it with a check sum and sequence number as will be more fully explained hereinafter.

Following the return from the subroutine FINISH the control path calls the subroutine CONTROL to determine whether the FRZ signal or the RPL signal have caused bits to be written into a flag word. If the FRZ signal is present the control subroutine will clear the write OK bit in the flag word. This will cause the program to bypass block 392 during cycles 0–2 and prevent the logging of further data in the DRAM memory. Further, if the signal RPL is present, the replay bit in the flag word will be found by the routine CONTROL which will set an output bit so that the DRAM memory may be read out.

In block 406 the output bit is tested for its presence to sequence the program to block 408 if the test is true. Block 408 calls the routine OUTPUT which empties the DRAM memory through the ARINC interface and then resets the write OK bit in the flag word such that a new sequence can begin.

After the tasks of the real time output to the recording device and the recall feature, blocks 410 and 412 are used to output the test word during cycle time 5 in response to a commond word. Similarly, blocks 414, 416 echo the command word during cycle time 6 while block 418 is used to output EAROM data during cycles 7–9 if requested by the test set.

Figure 8:
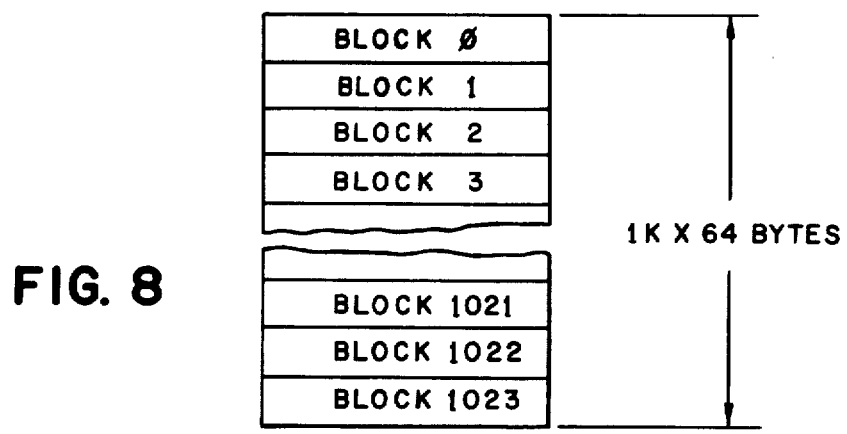
FIGS. 8 and 9 are pictorial representations of the software segmentation of the DRAM illustrated in FIG. 2.
Figure 9:
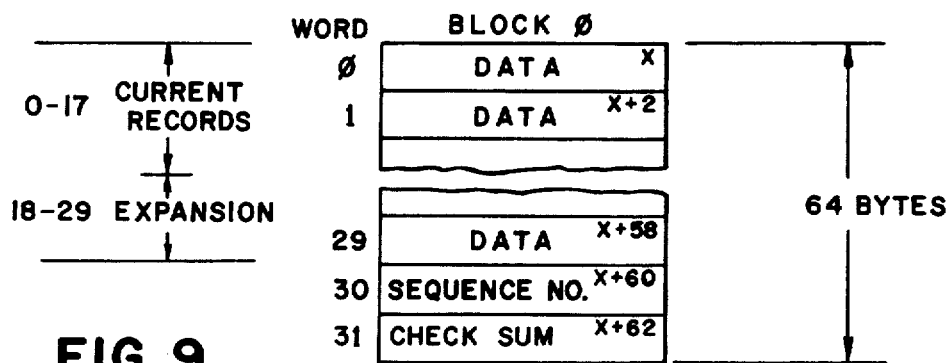

With reference now to FIG. 8, there is illustrated in the software organization of the DRAM memory for the real time recall feature. It is seen that the memory is 64K bytes in length and is subdivided into 1,024 blocks of equal lengths. FIG. 9 shows the formatting for each block where each block of 64 bytes of memory is divided into 32 sixteen-bit words. The 32 words have data contained in the first 30 and two special words in word positions 30 and 31 to fill out the block. Word 30 is reserved for a sequence number which indicates the order in which the block was written with respect to other data in the memory and word 31 contains a check sum of the first 31 words of the block. It is seen presently that the first 18 memory positions, words 0–17, are reserved for records currently output during one frame of the present data processor cycle. The next 12 memory positions, words 18–29, have been reserved for expansion.

Figure 10:
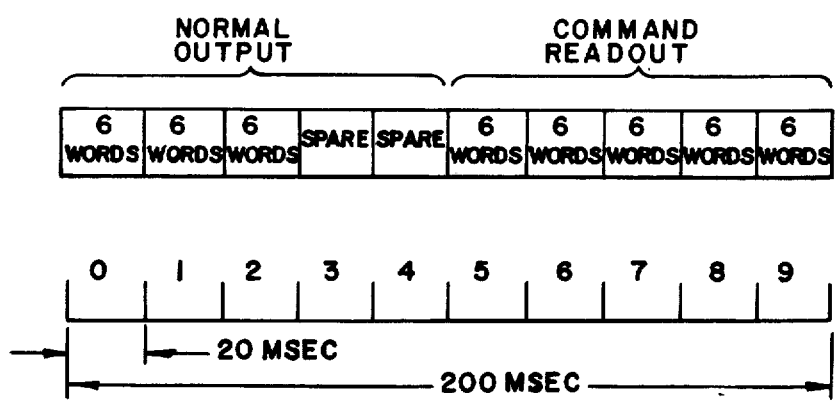
FIG. 10 is a pictorial representation the input and output during the cycle times of the engine data processor for the DRAM illustrated in FIG. 2.

The basic timing scheme for loading an unloading the DRAM memory is illustrated in FIG. 10 where the major 200 millisecond frame and 20 millisecond cycle time is illustrated. As was discussed previously, the engine data processor will output six words per cycle during cycles 0–2 and these are the 18 words that are located into words 0–17 for the current block being written. The DRAM memory, therefore, fills one block per frame time and receives the 18 words in the first three cycles of the overall 200 milliseconds frame for each block. It is noted that the spare cycles 3–4 in the first five cycles of the frame are spare and could be used to store another six data words apiece. The expansion capability of the DRAM coincides with that of the engine data processor such that if these cycle times are used in the future that ready storage space has been reserved in the DRAM memory.

In reading data from the DRAM just the opposite operation occurs to writing the memory during cyle times 5–9. Each data block is accessed in the reverse order of its sequence number and the 30 words found therein loaded into the ARINC interface to be output during the assigned cycle times. The DRAM, therefore, will unload one block of data every frame and six words per cycle during cycle times 5–9.

Figure 11:
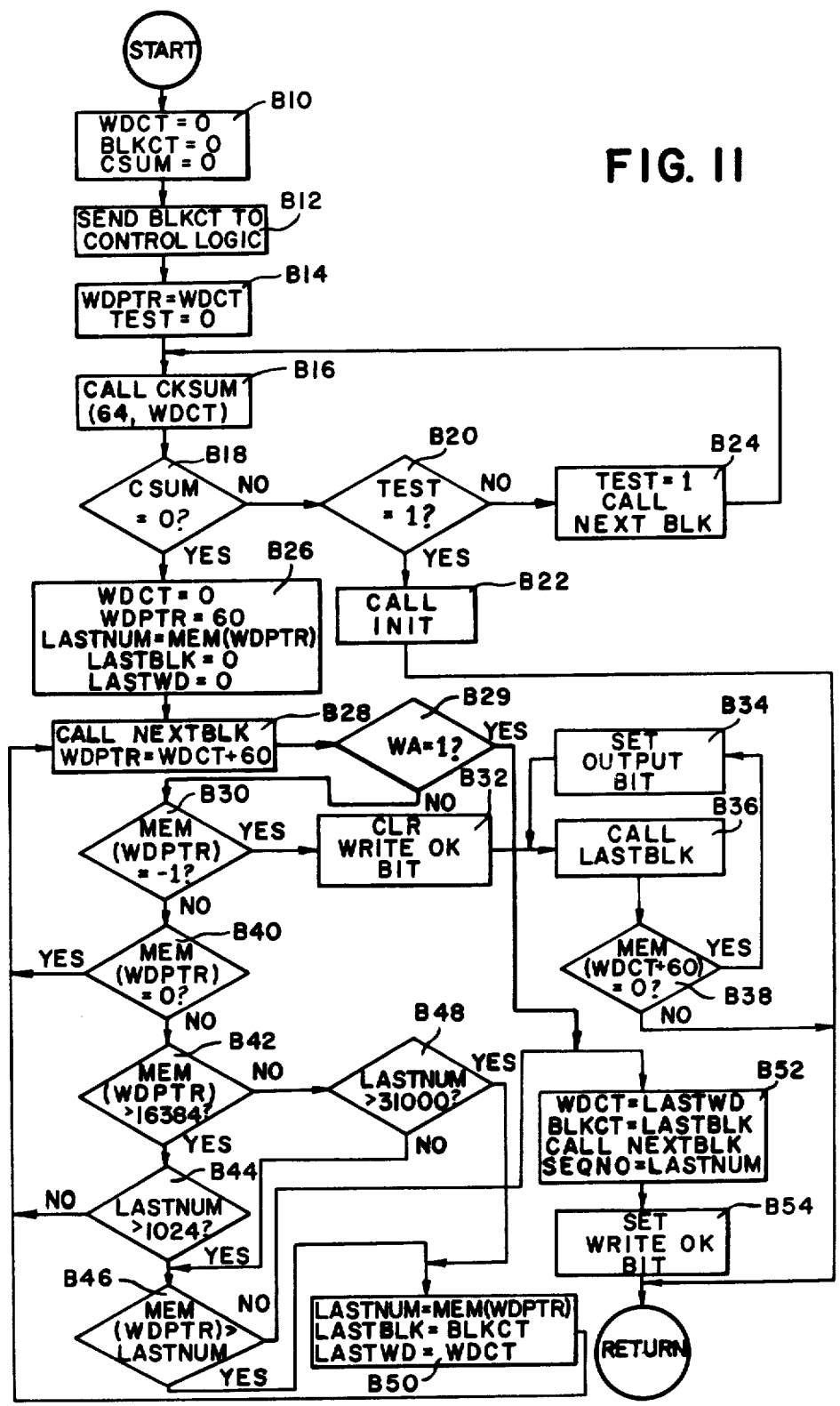
FIG. 11 is a detailed flow chart of the routine RESTART for the DRAM illustrated in FIG. 2.

In FIG. 11 there is shown the RESTART routine for the DRAM memory for cases where writing to or reading from a particular block in the DRAM was not completed because of an interrupt or a powerdown condition occurs. Reference to FIGS. 8 and 9 in conjunction with the following description will be helpful in understanding the operation of this routine. Functionally, the RESTART routine checks the first two memory blocks to determine whether either of their check sums agree. If both check sums fail, then an initializing routine is called while otherwise the routine finds the last block operated on and the mode of operation of the memory block when interrupted.

The routine begins with block B10 where the variables WDCT, BLKCT and CSUM are set equal to zero. The variable WDCT is used as a pointer addressing the first word of a block in memory and the variable BLKCT is used for pointing toward the particular hardware page in the memory that is currently addressed. In block B12 the value of BLKCT is sent to the control logic to set up the page addressing through the CRU interface. The variable WDPTR is set equal to the variable WDCT and a test variable TEST is set equal to zero in block B14. The variable WDPTR or the word pointer is used to address a particular word in a block that is headed by the address WDCT.

Next, the subroutine CKSUM is called in block B16. The subroutine CKSUM enables a number of bytes to be summed together by giving the subroutine the desired number of bytes, in this case 64, and the starting address of the group in this case WDCT. Because the variable WDCT was set equal to zero in block B10, the subroutine CKSUM adds all the contents of the BLOCK 0 of the DRAM memory together and provides the result in the location CSUM back to the RESTART routine. Since every block including BLOCK 0 ends with a check sum word which is the negative of the summation of the rest of the addresses, the routine CKSUM should return a zero to location CSUM if that block contains valid data.

The variable CSUM is then tested to determine whether it is zero in block B18 and thus whether BLOCK 0 has passed the test. If the first block was being written into when the power failure or interrupt of the program occurred, then it may not have a correct check sum and therefore, the routine takes the no path to B20. In block B20 the variable TEST is tested to determine whether it is equal to one. On an initial pass through this part of the loop, the test will be failed and control transferred to block B24 where the variable TEST is set equal to one and the subroutine NEXTBLK is called.

The subroutine NEXTBLK is used to assure that the calling routine does not address a location off the present hardware page or if it does that BLKCT is updated and sent to set up the needed page word in the hardware. The routine returns with WDPTR equal to WDCT and that variable pointing to the first word of the next block of memory. The program then cycles back to the block B16 where the subroutine CKSUM returns the result of the addition of the contents of block 1. In block B18 the variable CSUM is again tested for a zero condition indicating that the second block has passed the test. If it does not the program then again cycles to the test in block B20 where the variable TEST will now be one and the affirmative branch followed to block B22.

If both the first and second block of the memory do not meet their check sums it is felt that the memory should be reintialized by writing zeros to the entire memory and the subroutine INIT is called to accomplish this task. After the routine INIT zeros out the memory, the control path is to the return and thereafter, to the foreground monitor, if no further interrupt routines are scheduled.

However, if either the first or second blocks of memory passes the check sum test by taking the affirmative branch of block B18, then the program will determine which mode of operation that the memory was in at the time of interruption. There are three modes that the memory could have been in when interrupted. The first is the logging mode where data was being written into the memory in synchronization with the output cycles the engine data processor. The second mode the memory could have been in was a frozen state where no further data was being logged. Lastly, the memory could have been in an output state where the profile blocks were being read from memory and output over the ARINC interface to the AIDS system. This path in the RESTART routine will determine on the basis of the sequence numbers the mode of operation of the memory at the interrupt and reset those variables needed to continue that mode.

Therefore, to begin the tests to determine the last mode of operation, block B26 sets the variable WDCT equal to zero, the variable WDPTR equal to 60, the variable LASTNUM equal to the contents of the memory location labeled WDTPR, the variable LASTBLK equal to zero, and the variable LSTWD equal to zero. The variable WDCT is the starting address of the current block, block 0 in this case, that is being examined and LASTNUM now contains the sequence number of block 0. The routine moves to block B28 where the subroutine NEXTBLK is called such that the word count WDCT, and word routine WDPTR now address the start of block 1. The next instruction in block B28 sets the variable WDPTR equal to WDCT +60 which is the address of the sequence number of block 1.

A variable WA is checked in block B29 to determine whether it is equal to 1 and thus indicate that a wrap-around condition has occurred. If the test is negative the program continues in a block B30 by testing the contents of WDPTR to determine whether it is equal to a −1. If that test is positive, it indicates that the memory was frozen and the program should now determine whether the system was, additionally, in an output mode at the time of interruption. The path for a positive test in block B30, sequences to block B32 where the write OK bit is cleared because it has now been determined that the mode of operation was either a freeze mode or an output mode.

After block B32, block B36 is executed to call the subroutine LASTBLK which sets the variable WDCT equal to the starting address of the previous memory block. Thereafter, in block B38, the contents of the memory location of WDCT +60 is tested to determine whether it is equal to zero. This test is a determination of whether the sequence number of the block previous to the block with a sequence number of −1 is zero. If the sequence number is nonzero, then the negative path is followed from block B38. This branch indicates the memory was in a frozen mode and the variables WDCT, WDPTR presently point to the start of the last block written. Therefore, the routine may exit as it has found the last mode of operation and last block operated on.

If the previous sequence number is zero, the memory was in an output mode and the last block output must now be found. The program will find the last block which was output by cycling back through block B34, B36 after setting the output bit by calling the subroutine LASTBLK. This loop continues until a sequence number which is not equal to zero is found. At this point the variables word count WDCT, word pointer WDPTR, and the sequence number are set up to continue the output of the memory during the real time tasks, of the foreground monitor sequence. As before, the routine can now exit as it has found the last mode of operation and last block operated on.

The other path from block B30, where the sequence number was found not to be a −1 sequence to block B40 where the contents of the memory address labeled WDPTR is tested to determine whether it is equal to zero. This again tests the sequence number of the current block to determine whether the memory was in an output mode prior to the interruption of the program. If the sequence number is zero then the program cycles back to block B28 where it calls the subroutine NEXTBLK and determines whether the next sequence number is −1 or zero in block B30 and block B40. The cycle continues until a nonzero sequence number is found. Reading the sequence numbers in a forward direction by calling NEXTBLK will cause the next nonzero sequence number found to be a −1 when in an output mode. Thereafter, the program will sequence through blocks B32-B38 to set up the memory for continuing its output operation as previously described.

However, if both the tests in block B30 and B40 are negative, the operation by elimination must be one of logging and the block with the highest sequence number must be found. In block B42 the sequence number of the present block is tested to see whether it is greater than the value 16,384 by comparing the contents of the memory location labeled WDPTR with that number. If the test is passed the program sequences to block B44 where the variable LASTNUM is compared with the value 1024 to determine whether the sequence number of the previous block is greater than that value. If both of these tests are affirmative, the previous sequence number and the present sequence number are compared in block B46 to determine whether the present number is greater than the last number. If all three tests are positive, it is an indication that sequence numbers are ascending in positive sequence but that the highest sequence number has not yet been found. Therefore, the previous sequence number stored in the memory location LASTNUM is updated with the present sequence number in block B50 and the variable LASTBLK is updated with the present block count BLKCT and the variable LASTWD is updated with the present address WDCT.

The path through blocks B28, B29, B30, B40, B42, B44, B46, loop until the test in block B46 is failed. A negative result from the test in block B46 indicate that the highest sequence number has been found and therefore, the program should now exit in the logging mode. This task is accomplished in block B52 by setting the variable WDCT equal to LASTWD, the variable BLKCT equal to LASTBLK and tnen calling the subroutine next block NEXTBLK. Thereafter, the variable SEQNO is set equal to the variable LASTNUM and the write OK bit set in block B54. This sequence of functional steps sets up the block addressing and the sequence number for logging data into the next block during the foreground monitor routine.

The tests in blocks B42, B44 and B48, prior to the test of whether the present sequence number is greater than the previous sequence number is to eliminate the ambiguity of a condition where later sequence numbers although subsequent in time are smaller in value than the previous sequence numbers. This condition will occur only during the first 1K of profiles when the memory wraps around after the largest sequence number 32,768 has been recorded. Therefore, the test in block B42 determines whether the present sequence number is greater than one-half of the maximum value (16,348) of sequence numbers. If it is not branching to the test in block B48, the previous sequence number is checked to determine whether it is greater than 31,000. If the present sequence number is less than half the maximum value and the previous sequence number is almost the maximum, then the wraparound condition is present. Therefore, the latest positive sequence number has not been found and the program cycles through block B50 and back to block B28 where the next block and sequence number is called.

If however, the difference is not as great as the affirmative path, then a negative path to block B46 is taken to determine whether a present sequence number is greater than the previous sequence number in block B46 in the normal manner. Block B44 tests for the special case in which the difference is considerably great and the previous sequence number is less than 1024. This magnitude of difference in the sequence numbers and a low previous sequence number again indicates that a wraparound condition has taken place and that the program should check the next block by returning to block B28 through the negative path of block B44.

Block B29 is to test for another special condition where the memory is initialized (all zeros) and the program is looping through the tests in blocks B28, B30, B40. When the subroutine LASTBLK rolls over to the start of memory, it will set the variable WA=1 such that the program test in block B29 is affirmative. The sequence is thereafter to blocks B52, B54 where the routine can exit normally.

In FIG. 12 there is shown the subroutine INIT that is used to initialize the entire memory with zeros. Starting in block B56 the variables indicating the word count WDCT, the block count BLKCT, and the sequence number SEQNO are set equal to zero. The block count BLKCT is then transmitted to the hardware control logic in block B58 to set up the page address in CRU space. Next the program stores a value of zero in the memory address of WDCT. In this particular case since the memory has been started at BLOCK 0 the loading will be the first address of BLOCK 0 of the memory. The variable WDCT is then increased by 2 to address the next location and then tested in block B62 to determine whether it is greater than or equal to 2048. The test in block B62 indicates when the word count has exceeded the bounds of a hardware page while storing zeros.

The program loops between the block B60 and block B62 until it exceeds the value in the test. At this point the first hardware page has been initialized. Thereafter, Block B64 is executed to increase the block count BLKCT by one and block B66 tests the count against the value 32. Once the block count BLKCT is equal to 32, the entire memory will have been initialized and the affirmative path to block B68 will provide an exiting sequence. However, if the block count BLKCT is less than 32, the program has additional hardware pages of memory to initialize and sequences back to block B58 to set up the next page address by sending BLKCT to the control logic. Successive hardware pages are addressed in this loop until the entire memory is full of zeros and fully initialized.

After the memory has been intialized, block B68 sets the variables WDCT, BLKCT, and WDPTR equal to zero and again sets up the hardware page address by executing block B70. The write OK bit is set in block B72 and indicates the initialized memory is now ready for the logging mode of operation.

The subroutine COPY will now be more fully explained by reference to FIG. 13. The subroutine begins in block B74 by checking whether the write OK bit is set. If the write OK bit is clear, the negative path is followed and the subroutine returns to the ARINC output routine from which it was called. Thus, unless the RECALL feature is in a logging mode, the memory will be bypassed. If the write OK bit is set, meaning that it is presently all right to log data in the memory, an affirmative path will be taken to block B76. In that block the particular parameter being output by the ARINC output routine to the ARINC interface will additionally be copied into the DRAM location whose address is WDPTR. Thereafter, the word pointer WDPTR is increased by 2 to point to the next memory location in block B78 . The subroutine then returns to the location in the ARINC output routine from which it was called.

In FIG. 14, the subroutine FINISH is set forth in more detail. The subroutine begins in block B80 by checking whether the write OK bit is set. If not, the subroutine returns immediately to the ARINC output routine and no further action is taken. However, if the bit is set, the condition indicates that the system is in a logging mode of operation and has finished writing a block of data into the DRAM memory. This routine completes the just written block by incrementing the last sequence number and then storing that number in the next-to-the-last word of the present memory block. The routine further provides a check sum for the last memory location in that block.

When the program determines that the write OK bit has been set, its sequences to block B82 where the present sequence number SEQNO is stored in the memory location of the current block at the address WDCT+60. Subsequently, the sequence number SEQNO is tested to determine whether it is greater than the maximum sequence number 32768 in block B86. If it is not, the program continues to block B90 through the negative branch of the test. If it is, then the present sequence number SEQNO is set equal to +1 in block B88 to start the sequence again.

Continuing in block B90, the subroutine CKSUM is called to take a check sum of the first 62 bytes of the current memory block beginning with the variable WDCT. Thereafter, in block B92, the negative value of the check sum is stored in the memory location having the address WDCT+62. This address is the last word in each block and when the check sum is taken of the entire block, the correct result should be zero. Thereafter, the subroutine NEXTBLK is called to set up the next block of memory for logging. The subroutine, after completing these tasks exits to the ARINC output routine at the location from which it was called.

The subroutine CONTROL will now be more fully described with respect to FIG. 15. This subroutine checks the signals FRZ and RPL to determine whether the logging mode should be terminated for the memory and whether the engine profiles stored in the memory should be output, respectively. The subroutine begins in block B96 where the freeze bit is tested to determine whether the flag has been set. If it has not, the program immediately sequences to block B98 where the write OK bit is tested to determine if it is clear. If the test in block B98 is negative and immediately follows the negative branch of block B96, it is an indication that neither a capture mode nor an output mode is desired. Normally, this is the path the program takes during a logging sequence and provides the shortest test path while still checking every frame to determine whether the FRZ signal and RPL signal have set their respective bits.

If the freeze bit is set in block B96, then the write OK bit is cleared in block B100 putting the recall call feature into a capture mode. Instead of returning immediately, the sequence from block B98 is now diverted to block B102. In this block the replay bit is tested to determine whether it has been set. A negative determination returns the program to the ARINC output routine immediately whereas an affirmative response provides a transfer to block B104 where the output bit is tested to determine whether it is set. If the output bit is already set the program returns immediately to the calling routine while the negative path executes a sequence for initializing the OUTPUT routine.

The initializing sequence for the routine OUTPUT begins in block B106 where the output bit is set. Next in block B108 the sequence number location WDCT+60 of the presently addressed memory block is loaded with a −1. This special sequence indication will provide a specialized mark where the memory was frozen. If the output operation is interrupted the RESTART routine can find this block by means of this unique sequence number. Subsequently, in block B110 the subroutine CKSUM is called to take a check sum of the first 62 bytes of the block beginning at the address WDCT. In block B112, the negative value of CSUM returned from the subroutine is stored in the memory location whose address is WDCT+62. This is the last word location in the present block of memory and provides a convenient means for taking a check sum of the entire block. In block B114 the program calls the subroutine LSTBLK to set the word count WDCT, word pointer WDPTR, and block count BLKCT, variables to the correct value for the OUTPUT routine. The subroutine then returns to the ARINC output routine from which it was called.

Figure 16:
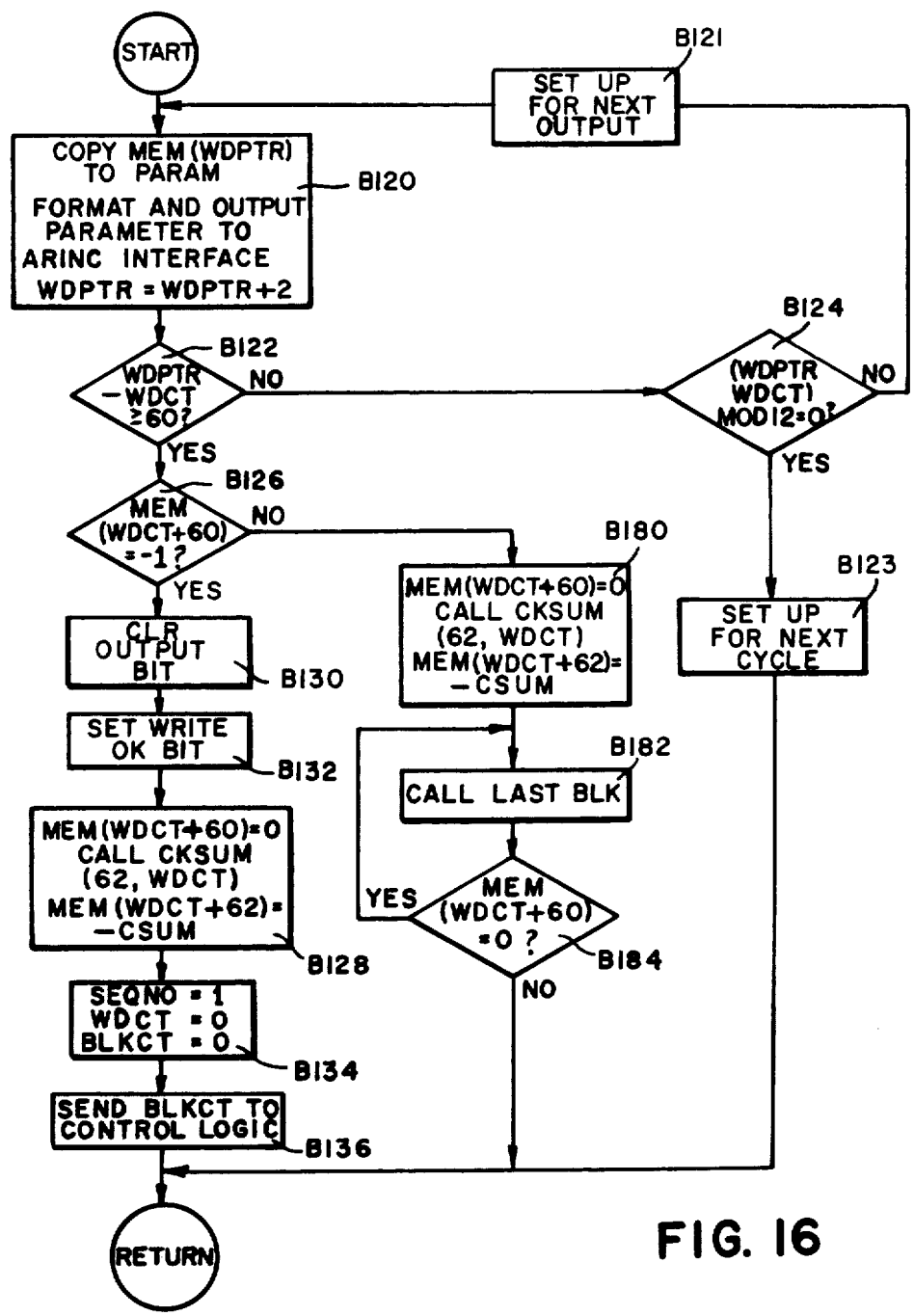
FIG. 16 is a detailed flow chart of the subroutine OUTPUT illustrated in FIG. 7c.

The routine OUTPUT will now be more fully described with respect to FIG. 16. The program advances to block B120 where the contents of the memory location whose address is word pointer WDPTR is formatted and then transferred to the ARINC interface. The ARINC device 230 transmits the output parameter to the AIDs system for permanent recordation during the correct cycle time. The word pointer WDPTR is then incremented by 2 to address the next location in the memory. The program sequences to block B122 where the difference between the word pointer WDPTR and the word count WDCT is tested to determine whether it is greater than or equal to 60. Passage of this test indicates that all 30 data words in the present block of memory have been transferred to the ARINC interface for output.

If, however, the negative branch is taken to block B124 this indicates that there are still words in the present block of memory to be output. The next test in block B124 determines whether the difference (WDPTR−WDCT) in module 12 is equal to zero. This performs a division of the number of words output by 12 and determines whether the remainder is zero. This is a convenient method of testing whether six words of the present cycle have been output to the ARINC interface. If not, the program takes a negative branch back to block B120 where another output word is transferred and repeats the loop through block B122 until six words of the present cycle have been output.

Afterwards, the program advances from block B124 through the affirmative branch back to the calling routine. Once five cycles have been completed and 30 data words transferred, the program will fall through the affirmative branch of block B122 to the block B126. Block B126 tests the sequence number of the block output to determine if it is a −1 and therefore whether all presently recorded blocks of the memory have been read out. If all have not been read out, then another block will be addressed and output the next frame by sequencing to block B180 where the sequence number SEQNO of the present block is set equal to zero by storing that value in the memory location whose address is WDCT+60.

Next, in block B180 a statement is executed to call the subroutine CKSUM. This operation corrects the check sum of the present memory block after the sequence number was set to zero. The corrected check sum is then stored in the last address of the present memory block. Thereafter, the subroutine LASTBLK is called in block B182 to sequence the routine to the previous memory block. This continues to readout sequence in descending address order where the last block logged in memory is the first block output. Before the subroutine exits to the calling routine the sequence number of the previous block is tested in block B184 to determine whether it is zero. If it is, a loop is formed calling previous blocks in a descending sequence by looping through block B182 until one is found where the sequence number is nonzero.

Thereafter, the program cycles through the previous paths until the entire memory has been output to the ARINC interface. The program transfers control to block B126, where a −1 in the sequence number location of the last memory block will indicate that the OUTPUT routine has completely emptied the entire memory and can now exit. Next in block B130, the output bit is cleared and the write OK bit set in block 132. These steps reset the memory so that new profiles can be logged into memory in the manner previously described.

Next in the sequence is block B128 which loads a zero into the sequence number of the last memory block location and then performs a check sum on the block by calling a CKSUM. The negative value of CSUM is thereafter loaded into the last word position of the block by storing the value at the address WDCT+62. Thereafter, in block 134 the sequence number SEQNO is set equal to +1, the word count WDCT set equal to zero, and the block count BLKCT set equal to zero. This will initiate the new logging sequence at the start of the memory which is now initialized by having zero sequence numbers in all sequence word locations. The CRU memory space is then repaged by sending the block count BLKCT to the control logic in block B136. Thereafter the subroutine returns to the calling routine.

FIG. 17 is the detailed flow chart for the utility subroutine NEXTBLK which sets up the addressing and pagination for manipulating the next block of memory after a present block. In the block B138 the variable WDCT which currently addresses the initial address of the present memory block is incremented by 64 to address the starting address of the next consecutive block of memory space and the wraparound variable WA set equal to zero. The variable WDCT is then tested in block B140 to determine whether it is greater than or equal to 2048 which is the maximum legal address for each hardware page. If the memory does not have to change hardware pages, the program sequences to block B152 where the variable WDPTR is set equal to the variable WDCT. The program then returns to the calling routine.

An affirmative result of the test in block B140, however, causes a hardware page change in the memory space. This is accomplished by first setting the variable WDCT back to zero in block B142 and increasing the block count BLKCT by +1 in block B144. In block B146 the block count BLKCT is tested to determine whether it is greater than or equal to 32. If it is, block B148 sets the block count BLKCT back to zero and the variable WA equal to 1, and if not, the program immediately continues. Block B148, executed in the affirmative path from the test in block B146 is to provide a wraparound such that when the memory is finished addressing the last hardware page, the new page address will wrap back to the starting address of the first page. After the page number has been set, it is sent to the control logic in block B150 to set up the page CRU space. Thereafter, the subroutine proceeds to block B152 where WDPTR is set equal to WDCT. The program will then return from where it was called after the pagination sequence has completed.

FIG. 18 illustrates a companion utility subroutine of NEXTBLK which is the subroutine LASTBLK. Just as NEXTBLK perform the pagination of the memory for subsequent memory blocks, the subroutine LASTBLK performs the initialization of address variables and pagination of the previous blocks of memory. After it is called, the program sequences to block B160 where 64 bytes are subtracted from the word count WDCT to have it point to the first location of the previous block of memory. The word count WDCT is then tested in block B162 to determine if it is less than zero. If not, the memory address is still within page limits and the program continues to block B174 where the variable WDPTR is set equal to the new address of WDCT.

However, if the word count is less than zero a page limit has been exceeded and WDCT is set equal to 1984 in block B164. The value of that variable is the initial address of the last block (64 bytes) of each hardware page. Thereafter, +1 is subtracted from the block count BLKCT in block B166 and that variable tested to determine whether it is less than zero in block B168. If the block count BLKCT is less than zero, this condition indicates that the memory has sequenced past the start of page zero and should be wrapped around to page 31. Therefore, the block count BLKCT is set equal to 31 in block B170 prior to sending it to the control logic in block B172. After the pagination sequence has been executed, the program continues in block B174 by setting the word pointer WDPTR equal to the word count WDCT and then exiting.

FIG. 19 illustrates the utility subroutine CKSUM. This subroutine is used for taking a check sum of a block of bytes by calling the routine and transferring variables indicating a starting address and the length of the block in bytes. Block B154 sets the starting address variable ADDR equal to the starting address transferred to the routine and zeros the variable CSUM where the results of the addition are returned to the calling routine. Thereafter, the address variable ADDR is tested in block B156 to determine whether it is greater than the starting address plus the length in bytes to be added. If it is not, the variable CSUM is set equal to its previous value plus the contents of the memory location whose address is ADDR. Thereafter, the variable ADDR is updated by incrementing it by 2 to address the next memory location. The program will then flow back to block B156 where the variable ADDR is again tested to determine whether the summation is finished. As soon as the variable APDR is equal to the starting address plus the length of the block, the program will exit through the affirmative branch of the test in block B156. The memory location whose label is CSUM contains the results of the addition.

While the preferred embodiment of the invention has been shown and described, it will be obvious to those skilled in the art that various modifications and changes may be made thereto without departing from the spirit and scope of the invention as hereinafter defined in the appended claims.

We claim:

1. An engine data processor system having a real time recall feature, said system comprising:
   means for measuring a plurality of operating parameters of an engine in real time;
   means for converting the measured operating parameters into a data table having a plurality of separate words, each set of parameters defining an engine profile indicative of the value of the measured parameters;
   means for updating said data table at an input cyclic rate with new values of said operating parameters;
   means for communicating with a permanent data recordation device over an output channel;
   means for outputting words from said data table at an output cycle rate to said communicating means;
   auxiliary memory means;
   means for controlling said auxiliary memory means, said controlling means being capable of writing information into said auxiliary memory and reading information from said auxiliary memory;
   said controlling means being operable in a first mode communicating said words from said data table at said output cycle rate and storing them in said auxiliary memory;
   said controlling means being operable in a second mode set by a command at a particular time to discontinue storing said words from said data table in said auxiliary memory;
   said controlling means being operable in a third mode set by a second command at a particular time to transmit said stored words at said output cycle rate to said communicating means.

2. An engine data processor system as defined in claim 1, wherein said controlling means stores a sequence number word in said table corresponding to each said profile after the storage of a said profile, said sequence number being positively incremented for each block and beginning at a +1 when the number exceeds the maximum of the word.

3. An engine data processor as defined in claim 2 said controlling means stores a check sum word associated with each said profile after the storage of a profile, said check sum word being the negative of the additive sum of said words of said profile.

4. An engine data processor system as defined in claim 3, wherein said controlling means is operable in said first mode in response to an operator control switch toggled in response to the operator determining that a special event has occurred.

5. An engine data processor system as defined in claim 4, wherein said controlling means being operable in said first mode in response to an automatic alarm apparatus sensing an abnormal condition.

* * * * *